United States Patent [19]

Bailey, Jr. et al.

[11] Patent Number: 4,686,240

[45] Date of Patent: Aug. 11, 1987

[54] PROCESS FOR PRODUCING POLYURETHANE FOAMS USING FOAM MODIFIERS

[75] Inventors: Frederick E. Bailey, Jr., Charleston; Michael W. Jorgenson, Cross Lanes; Robert D. Whitman, Charleston, all of W. Va.

[73] Assignee: Union Carbide Corporation, Danbury, Conn.

[21] Appl. No.: 791,515

[22] Filed: Oct. 25, 1985

[51] Int. Cl.⁴ .............................................. C08G 18/14
[52] U.S. Cl. .................................... 521/103; 252/182; 521/99; 521/106; 521/111; 521/114; 521/123; 521/125
[58] Field of Search ................. 521/103, 99, 106, 111, 521/114, 123, 125; 252/182

[56] References Cited

U.S. PATENT DOCUMENTS

| | | | |
|---|---|---|---|
| 3,560,544 | 2/1971 | Haluska | 260/448.2 |
| 3,804,782 | 4/1974 | Demou et al. | 260/2.5 AW |
| 4,336,341 | 6/1982 | Fujwara et al. | 521/109 |
| 4,468,478 | 8/1984 | Dexheimer et al. | 521/125 |
| 4,469,820 | 9/1983 | Dexheimer et al. | 521/125 |
| 4,478,959 | 10/1984 | Bechara et al. | 521/124 |
| 4,546,116 | 10/1985 | Müller et al. | 521/125 |

FOREIGN PATENT DOCUMENTS 0138102 9/1984 European Pat. Off.

*Primary Examiner*—Maurice J. Welsh
*Attorney, Agent, or Firm*—Eugene C. Trautlein

[57] ABSTRACT

This invention relates to a process for producing water-blown, flexible polyurethane foams for improved foam stability and molded water-blown, flexible polyurethane foams that are rapidly demoldable with improved green strength. The process involves the use of certain compounds ("foam modifiers") as hereinafter more specifically defined. The foam modifiers consist of an alkali metal or alkaline earth metal ion and an anion of a Brönsted acid having a pKa of greater than 1 (other than: (a) an inorganic alkaline earth metal salt that has a water solubility of less than one gram of salt per 100 milliliters of water at 25° C., (b) alkali metal dihydrogen phosphate and (c) alkali metal sulphate).

124 Claims, No Drawings

PROCESS FOR PRODUCING POLYURETHANE FOAMS USING FOAM MODIFIERS

FIELD OF THE INVENTION

This invention relates to a process for preparing stable, flexible, water-blown polyurethane foams that are rapidly demoldable with improved green strength.

DESCRIPTION OF THE PRIOR ART

Flexible polyurethane foams have many commercial uses, such as in packaging, insulation, mattresses, furniture, cushions, carpet underlay, etc. Important properties of these foams are load bearing capability, resiliency, tensile strength and tear strength. The principal commercial procedure for the production of flexible polyurethane foams is the ("one-shot") technique of reacting and foaming of all starting materials in one step. The starting materials usually include a polyol, a polyisocyanate, water, catalysts, a silicone surfactant and a crosslinker. In view of the fact that the polyols may be produced using an alkali metal compound as a catalyst, the polyols may contain up to 0.002 gram milliequivalents of an alkali metal per 100 g. of polyol. Such alkali metals are removed from the polyols prior to the use of the polyols in making polyurethanes because such alkali metals are believed to be deleterious in the formation of polyurethanes by the one shot technique.

In addition to the polyurethane-forming reaction of the polyol with the polyisocyanate in the one-shot process, water reacts with polyisocyanate to form an amine which subsequently reacts with isocyanate to form urea. These reactions yield a urea-urethane polymer which is highly diluted during the foaming reaction by evolved carbon dioxide (formed by the reaction of water with isocyanato groups) and, possibly, by the volatilization of halocarbon compounds (auxiliary blowing agents). The foam which results is termed a water-blown, flexible polyurethane foam.

Commercially, water-blown flexible polyurethane foams are produced by both molded and slab foam processes. Slab foams are generally produced in large buns which, after curing, are sliced or otherwise formed into useful shapes. For example, carpet underlayment is sliced from large buns of polyurethane foam. Molding is utilized to produce directly an object in essentially its final dimensions. Automotive seating and some furniture cushions are examples of employment of the molding process. An important consideration in molding of flexible polyurethane foams is the demold time. The demold time is the time from the mixing of the polyisocyanate with the other starting materials to the removal of the molded foam from the mold and is usually from 5 to 8 minutes in commercial practice. It is highly desirable to utilize a formulation which will permit rapid demolding of the cured foam which has good green strength (i.e., strength as initially produced) and so is resistant to tearing or "finger-printing", regardless of the foam density. It is also desirable to improve the resistance to combustion of both molded and slab foams, again regardless of the foam density.

In producing water-blown, molded or slab flexible polyurethane foams, the amount of water and any auxiliary blowing agents used will primarily determine the density of the foam and, to a certain extent, the load bearing characteristics of the foam. As water content increases, the foam density decreases due to the generation of increased carbon dioxide by the initial reaction of water with the polyisocyanate. The function of a number of the ingredients in the foaming formulation, such as the silicone surfactant, crosslinking agent and catalysts, is to provide a stable foaming system during foam generation so that foams with controlled foam cell sizes result which have the necessary physical properties (particularly adequate load bearing capability, resiliency, tensile strength and tear strength) for the uses to which these foam products will be put. It is of preeminent importance that stable foams be generated during foaming. From a commercial standpoint, it is desirable to produce a lower density foam which still possesses the aforementioned physical properties. It would be desirable to decrease the density of the foam by increasing water content.

However, in known formulations for producing flexible polyurethane foams, there has been a limit to the level of water which could be included in the formulations and still produce foams having good properties. Prior art water-blown, flexible polyurethane foams produced from formulations containing large amounts of water relative to the reactivity of the hydroxyl groups in the polyol [e.g., formulations containing greater than 3.5 parts by weight of water per 100 parts by weight of a polyol with a high primary hydroxyl group content (i.e., a polyol wherein greater than 50% of the hydroxyl groups are primary hydroxyl groups) or formulations containing greater than 5.5 parts by weight of water per 100 parts by weight of polyol with a high secondary hydroxyl group content (i.e., a polyol wherein greater than 50% of the hydroxyl groups are secondary hydroxyl groups)] either collapsed, were difficult to process, or generally had poor physical properties.

The following patents illustrate the general state of the art described above.

U.S. Pat. No. 3,560,544 describes triorganosiloxy end-blocked polyoxyalkylene siloxane polymers comprising the reaction product of an organosilicon compound and a cyclic carboxylic anhydride which may be subsequently reacted with an amine or alkali or alkaline earth metal. These polymers are broadly described as useful as foam stabilizers for polyurethane foams but the patent has no example of the production of any polyurethane foam.

U.S. Pat. No. 3,804,782 discloses a process producing water-blown, flexible polyurethane foams from formulations containing certain hexahydratriazines as isocyanate trimerization catalysts. Isocyanate was added in an amount that provided Isocyanate Indices (as defined below) up to 200. The patent discloses that the use of such catalysts obviates the need to impart flame retardant properties to the resulting polyurethane by other means such as the use of polymeric isocyanate, flame retardants, and the like.

U.S. Pat. No. 4,336,341 discloses a process for producing rigid polyisocyanurate foams which comprises reacting a polyisocyanate with the reaction product of a dibasic acid anhydride and a partially alcoholated polyether polyol subsequently reacted with an alkali or alkaline earth metal hydroxide. The reaction product acts as an isocyanate trimerization catalyst and as a polyol reactant with the polyisocyanate. Although this patent discloses the use of additional polyol reactants (polyol reactants in addition to the above-described reaction products) having hydroxyl numbers from 25 to 1,000, Example 7 in this patent is the only Example in which an additional polyol is used. The additional polyol in Example 7 had a hydroxyl number of 400. Similarly, although the patent broadly discloses the use of a wide range of Isocyanate Indices, the lowest Index used in any Example in this patent is probably greater than 500 (Example 7).

U.S. Pat. Nos. 4,468,478 and 4,469,820 disclose processes of producing water-blown, flexible polyurethane foams from formulations containing polyols that have been stabilized against oxidation by incorporating therein salts of alkali metals and certain benzoic acid derivatives. These patents disclose that the salts can be produced in situ in the polyols by reacting benzoic acid derivatives with alkali metal catalyst residues present in the polyols. (Such alkali metal catalyst residues are the residues of the catalysts used to produce the polyols from starters and alkylene oxides). Alternatively, the patents disclose that the salts can be preformed and added to polyols from which the alkaline metal catalyst residues have already been substantially removed (presumably by physical means, such as by washing, absorption, or precipitation—see column 3, lines 22 to 26 of U.S. Pat. No. 4,468,478 and column 3, lines 22 to 26 of U.S. Pat. No. 4,469,820). Each patent contains only one Example of the production of a polyurethane foam from polyols containing such salts (i.e., Example 10 of U.S. Pat. No. 4,469,820 and Example 14 of U.S. Pat. No. 4,468,478). In both Examples, it appears that a preformed salt as such (not dissolved or dispersed in a liquid medium) was added to the polyol used to produce the polyurethane; three parts by weight of water per 100 parts by weight of a polyol having mostly primary hydroxyl groups was used; and a flexible slab foam was produced. In Example 14 of U.S. Pat. No. 4,468,478, the polyurethane so produced is described as having had some shrinkage, as being pock-marked at the top, and as having an unevenness of the size of the pores in its central portion (which is stated as being indicative of too fast a reaction rate). The properties of the polyurethane foam produced in Example 10 of U.S. Pat. No. 4,469,820 are not described in that Example.

U.S. Pat. No. 4,478,959 describes the preparation of polyurethanes utilizing amino and amido divalent metal carboxylates as catalysts. These catalysts are prepared in three steps. First, a secondary amine or a tertiary amino alcohol is reacted with an acid anhydride. In the next step the compounds are reacted with an alkali metal. Finally, two moles of the alkali metal salt so formed are then reacted with one mole of divalent tin, zinc, cobalt or nickel. The final step is consistent with the industry practice of removing the alkaline metal catalyst residues if a polyol is intended for use in preparing polyurethanes (see U.S. Pat. Nos. 4,468,478 and 4,469,820, noted above).

European Pat. No. 0 138 102 discloses a process for producing flexible, water-blown polyurethane foams from formulations characterized by the presence of:

(a) an organic or inorganic compound having the formula:

$$[R-O^-]Me^+$$

wherein $Me^+$ is an alkali metal (optionally in complexed form) or a quaternary ammonium group and R is hydrogen, alkyl-, cycloalkyl-, aryl-, or aralkyl groups (which can also contain certain heteroatoms) or $R'-CO$, $R'-CS$, $R'-CO-O$, $R'-O$, or $R'-CO-NH$ wherein $R'$ is one of the organic groups represented by R;

(b) a labile halogen-containing substance; and, optionally, (c) a cross-linking agent of the general formula:

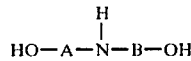

wherein A and B are $C_2-C_8$ alkylene or $C_5-C_8$ cycyloalkylene groups. Component (a) is disclosed in the patent as a compound that forms an alkaline aqueous solution. Table 3 of this patent shows the production of various polyurethane foams from formulations containing: a polyol with 70% primary hydroxyl groups [apparently the polyol of footnote 1]; from 2 to 3.5 parts water per 100 parts polyol; and potassium hydroxide (apparently added to the formulation as such or, in one instance, in water). It is not clear in which formulation aqueous potassium hydroxide was used in Table 3. Examples 6, 8, and 9 of this patent show the production of polyurethane foams from formulations containing: a polyol with secondary hydroxyl groups [the polyol of footnote 8]; from 2.7 to 5 parts water per 100 parts polyol; and potassium hydroxide (10% in octaethylene glycol). Example 7 of the patent is similar to Examples 6, 8 and 9 but uses the polyol of footnote 1) and 2.7 parts water. Since the foams of Examples 1 to 5 were formed in cardboard beakers and since rise times are indicated for the foams of Examples 6 to 9, it appears that all those foams were slab foams.

Despite the disclosures of the above invention patents, there remains a need for improving the stability of water blown, flexible polyurethane foams, especially at high water contents, and the green strength of rapidly demoldable water-blown, flexible polyurethane foams. There also remains a need for improving the combustion resistance of such foams.

OBJECTS OF THE INVENTION

Accordingly, it is an object of this invention to provide a novel process for the preparation of flexible polyurethane foams.

Another object of this invention is to provide a process for preparing flexible polyurethane foams from formulations with high water contents.

A further object of this invention is to provide a process for preparing flexible polyurethane foams which are capable of rapid demold and possessing improved green strength.

Still another object of this invention is to provide a process for preparing flexible polyurethane foams with improved resistance to combustion.

Further objects of this invention will become apparent to those skilled in the art from the detailed description thereof presented below.

SUMMARY OF THE INVENTION

This invention relates to a process for producing water-blown, flexible polyurethane foams of improved foam stability and molded water-blown, flexible polyurethane foams that are rapidly demoldable with improved green strength. The process involves the use of certain compounds ("foam modifiers") as hereinafter more specifically described.

DETAILED DESCRIPTION OF THE INVENTION

In one embodiment ("First Embodiment"), this invention relates to a process for producing flexible polyurethane foams having improved foam stability which comprises reacting and foaming in one step a reaction mixture comprising: (1) a polyol having an hydroxyl number from about 10 to about 100 and having greater than 50% primary hydroxy groups or greater than 50% secondary hydroxy groups based on the total hydroxyl groups in the polyol; (2) an organic polyisocyanate; (3) water; and (4) a compound (hereinafter referred to as a "foam modifier") consisting of an alkali metal or alkaline earth metal ion and an anion of a Brönsted acid having a pKa of greater than 1, wherein said compound is a compound other than: (a) an inorganic alkaline earth metal salt that has a water solubility of less than one gram of salt per 100 milliliters of water at 25° C., (b) alkali metal dihydrogen phosphate and (c) alkali metal sulphate and wherein said composition has an Isocyanate Index of from about 90 to about 130, with the proviso that, when there are greater than 50% (preferably greater than 70%) secondary hydroxyl groups in the polyol, there are greater than 5.5 parts (preferably greater than 6.0 parts) by weight water per 100 parts by weight of the polyol and with the further proviso that, when there are greater than 50% (preferably greater than 65%) primary hydroxyl groups in the polyol, there are greater than 3.5 parts (preferably greater than 4.0 parts) by weight water per 100 parts by weight of the polyol. Preferably, the maximum amount of water in the reaction mixture is 12 parts by weight per 100 parts by weight of the polyol.

In another embodiment ("Second Embodiment"), this invention relates to a process for producing molded flexible polyurethane foams that are rapidly demoldable and that have improved green strength comprising reacting and foaming in one step in a mold a reaction mixture comprising: (1) a polyol having a hydroxyl number from about 10 to about 100; (2) an organic polyisocyanate; (3) water; and (4) a compound consisting of an alkali metal or alkaline earth metal ion and a Brönsted anion of an acid having a pKa of greater than 1, wherein said compound is a compound other than (a) an inorganic alkaline earth metal salt that has a water solubility of less than one gram of salt per 100 milliliters of water at 25° C., (b) alkali metal dihydrogen phosphate and (c) alkali metal sulphate and wherein said composition has an Isocyanate Index from about 90 to about 130.

This invention also relates to polyurethane foams produced by the process of this invention, compositions comprising such foam modifiers dissolved, or stably dispersed, in a liquid medium and admixtures comprising foam modifiers and at least one other starting material used to make such foams (e.g., a polyol, catalyst or silicone surfactant).

The polyols useful in the present invention are any of the polyols presently employed in the art for the preparation of flexible polyurethane foams (provided, when used in the First Embodiment of this invention, they have the primary or secondary hydroxyl contents indicated above).

The polyols employed in the process of this invention can have hydroxyl numbers which vary over a relatively wide range. In general, the hydroxyl numbers of the polyols employed in the invention can range from about 10 to about 100, preferably from about 15 to about 85. The hydroxyl number is defined by the equation:

$$\text{OH No.} = \frac{56.1 \times 1000 \times f}{\text{m.w.}}$$

where:

OH No. = hydroxyl number of the polyol;
f = functionality, that is, the number of hydroxyl groups per molecule of polyol;
m.w. = number average molecular weight of the polyol.

Among the polyols which can be used in the process of this invention are those selected from one or more of the following classes of compositions, alone or in admixture, known to those skilled in the polyurethane art:

(a) alkylene oxide adducts of polyhydroxyalkanes;
(b) alkylene oxide adducts of non-reducing sugars and sugar derivatives;
(c) alkylene oxide adducts of phosphorus and polyphosphorus acids; and
(d) alkylene oxide adducts of polyphenols;

Polyols of types (a) to (d) above are referred to hereinafter as "base polyols". Illustrative alkylene oxide adducts of polyhydroxyalkanes useful as polyols in the process of this invention include, among others, the alkylene oxide adducts of ethylene glycol, propylene glycol, 1,3-dihydroxypropane, 1,4-dihydroxybutane, and 1,6-dihydroxyhexane, glycerol, 1,2,4-trihydroxybutane, 1,2,6-trihydroxyhexane, 1,1,1-trimethylolethane, 1,1,1-trimethylolpropane, pentaerythritol, polycaprolactone, xylitol, arabitol, sorbitol, mannitol, and the like. A preferred class of alkylene oxide adducts of polyhydroxyalkanes are the ethylene oxide and propylene oxide adducts of trihydroxyalkanes.

Preferred polyols useful in the process of this invention include the poly(oxypropylene) glycols, triols, tetrols and hexols and any of these that are capped with ethylene oxide. These polyols also include poly(oxypropyleneoxyethylene) polyols. The oxyethylene content should preferably comprise less than 80 weight percent of the total and more preferably less than 40 weight percent. The ethylene oxide, when used, can be incorporated in any fashion along the polymer chain. Stated another way, the ethylene oxide can be incorporated either in internal blocks, as terminal blocks, randomly distributed along the polymer chain, or a combination thereof.

The above-described base polyols can contain small amounts of "inherent" unsaturation (e.g., owing to the isomerization of propylene oxide to allyl alcohol during the manufacture of the polyol). In some cases it may be desirable to include additional unsaturation into the polyols (e.g., when it is desired to produce the polymer/polyols described below by certain techniques).

Another preferred class of polyols useful in the process of this invention are polymer/polyols. Polymer/polyols are polymers (preferably acrylonitrile-stryene copolymers) stably dispersed in a base polyol. The base polyols are described above and are preferably polyols of type (a) above. Suitable polymer/polyols are as disclosed in U.S. Pat. Nos. Re. 28,715 and Re. 29,118 and in U.S. Pat. Nos. 3,823,201; 4,104,236; 4,111,865; 4,119,586; 4,125,505 and 4,208,314; and U.S. patent application Ser. No. 594,633; filed Mar. 29, 1984. The polymer/polyols useful in the process of this invention include those sold by Union Carbide Corporation as "NIAX Polyols E-515, E-519, E-585, E-513, 31-28 and E-579"; those sold by Mobay Chemical Corporation as "Multranol E-9151"; those sold by BASF Wyandotte Corporation as "Pluracols 994, 806 and 873"; and those sold by Dow Chemical Corporation as "Voranols XUS-14031.01 and XAS-10963".

In addition to the base polyol and unsaturated monomers (preferably acrylonitrile and styrene), the reaction mixtures employed to produce the polymer/polyols useful in the process of this invention can contain any of of variety of other materials, including catalysts (such as azobisisobutyronitrile), polymer/polyol stabilizers, chain transfer agents (such as isopropanol) and the foam modifiers used in the process of this invention. When the foam modifier is present in the polymer/polyol reaction mixture, the resulting "foam modifier-polymer/polymer" has the advantageous properties of both the foam modifier and the polymer/polyol.

The polymer/polyols useful in the process of the present invention are preferably produced by utilizing the process set forth in U.S. patent application Ser. No. 699,970; filed Feb. 8, 1985. In accordance with that process, a low monomer to polyol ratio is maintained throughout the reaction mixture during the process. This is achieved by employing conditions that provide rapid conversion of monomer to polymer. In practice, a low monomer to polyol ratio is maintained, in the case of semi-batch and continuous operation, by control of the temperature and mixing conditions and, in the case of semi-batch operation, also by slowly adding the monomers to the polyol. The temperature range is not critical and may vary from and 100° C. to about 140° C. or perhaps greater, the preferred range being from 115° C. to 125° C. The catalyst and temperature should be selected so that the catalyst has a reasonable rate of decomposition with respect to the hold-up time in the reactor for a continuous flow reactor or the feed time for a semi-batch reactor. The mixing conditions employed are those obtained using a back mixed reactor (e.g., a stirred flask or stirred autoclave). The reactors of this type keep the reaction mixture relatively homogeneous and so prevent localized high monomer to polyol ratios such as occur in certain tubular reactors, e.g., in the first stages of "Marco" reactors when such reactors are operated with all the monomer added to the first stage. The polymer/polyols employed in the process of this invention are preferably produced in the presence of preformed stabilizers. Suitable preformed stabilizers include the stabilizers disclosed in U.S. Pat. Nos. 4,148,840; 4,350,780; 4,454,255; and 4,463,107.

Other types of polymer/polyols useful in the process of this invention are polyurea/polyols disclosed in U.S. Pat. Nos. 3,325,421; 4,042,537 and 4,089,835 and polyoxamate /polyols disclosed in U.S. Pat. No. 4,407,983.

The polyisocyanates that are useful in the process of this invention are organic compounds that contain at least two isocyanato groups. Such compounds are well known in the art of producing flexible polyurethane foams. Suitable organic polyisocyanates include the hydrocarbon diisocyanates, (e.g., the alkylene diisocyanates and the arylene diisocyanates) as well as known triisocyanates and polymethylene poly(phenylene isocyanates). As examples of suitable polyisocyanates are 1,2-diisocyanatoethane, 1,4-diisocyanatobutane, 2,4diisocyanatotoluene, 2,6-diisocyanatotoluene, 3,5-diisocyanato-o-xylene, 4,6-diisocyanato-m-xylene, 2,6-diisocyanato-p-xylene, 2,4-diisocyanato-1-chlorobenzene, 2,4-diisocyanato-1-nitrobenzene, 2,5-diisocyanato-1-nitrobenzene, 4,4'-diphenylmethylene diisocyanate (MDI); 3,3'-diphenylmethylene diisocyanate; and polymethylene poly(phenyleneisocyanates) having the formula:

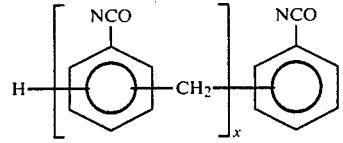

wherein x has an average value from 1.1 to 5 inclusive (preferably from 2.0 to 3.0). The preferred polyisocyanates are a mixture of 80% by weight 2,4-tolylene diisocyanate and 20% by weight 2,6-tolylene diisocyanate (hereinafter "TDI"); a mixture that is about 80% by weight TDI and about 20% by weight of a polymeric poly(methylene polyphenyleneisocyanate) of the formula:

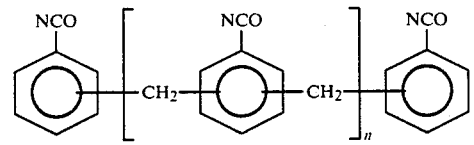

where n ranges from 0 to 2 (preferably about 0.6), "liquid MDI" is obtainable commercially from the Upjohn Company and is disclosed in further detail in U.S. Pat. No. 3,384,653; and all polyisocyanates of the MDI type.

The amount polyisocyanate included in the foam formulations (reaction mixtures) used in the present invention relative to the amount of other materials in the formulations is generally described in terms of "Isocyanate Index". As used herein, the term "Isocyanate Index" means the actual amount of polyisocyanate used divided by the theoretically required stoichiometric amount of polyisocyanate required to react with all the active hydrogen in the reaction mixture multiplied by one hundred [see Bender, Handbook of Foamed Plastics, Lake Publishing Corp., Libertyville, Ill. (1965)]. Thus, if the Isocyanate Index is 100, then the amount of isocyanato groups in the polyisocyanate is the exact stoichiometric equivalent of the reactive hydrogens in the formulation which will react with isocyanato groups (such reactive hydrogens usually being provided by water, polyol, crosslinker, foam modifier and the medium, if any, in which the foam modifier is dissolved or dispersed). As a further illustration, an Isocyanate Index of 110 indicates a 10 percent stoichiometric excess of isocyanato groups. The Isocyanate Indices in the reaction mixtures used in the process of this invention are between about 90 to about 130 and, preferably, the Isocyanate Indices in the reaction mixtures are between about 95 and about 120.

The cations in the foam modifiers employed in the process of this invention are alkali metal ions or alkaline earth metal ions. The anions in the foam modifiers employed in the process of this invention are derived from Brönsted acids with a pKa of greater than 1. It has been found that water-soluble compounds derived from alkali metal or alkaline earth metal ions and an anion of Brönsted acid having a pKa from 1 to 2.5 may not always function as foam modifiers in the process of this invention. Thus, although sodium dichloroacetic is an effective foam modifier, sodium dihydrogen phosphate and sodium sulphate are not effective foam modifiers. The effective foam modifiers in this class of compounds can be determined by routine experimentation. Hence, the acids from which the foam modifier is derived preferably have a pKa greater than 2.5. Most preferably, the maximum pKa of the acids from which the foam modifier is derived is 13. pKa is a quantity defined by the equation:

$$pKa = -\log_{10} K_a = -\log_{10}(H^+)(A^-)/(HA)$$

wherein HA is a weak acid that dissociates to give H$^+$ and A$^-$ and ( ) is the concentration (see *Handbook of Chemistry and Physics*, 66th Edition 1985-86, CRC Press, Inc., pp. D161-D163).

The pKa values of various suitable Brönsted acids are as follows:

| Acid | pKa at 25° C. |
|---|---|
| water | 14.00 |
| phosphoric: pKa$_3$ | 12.67 |
| carbonic pKa$_2$ | 10.25 |
| phosphoric: pKa$_2$ | 07.21 |
| acetic | 04.75 |
| chloroacetic | 02.85 |
| phosphoric: pKa$_1$ | 02.12 |
| dichloroacetic | 01.48 |

The foam modifiers employed in the process of present invention include a wide variety of compounds including:

A. alkali and alkaline earth metal hydroxides or alkoxides ("Type A"),

B. alkali and alkaline earth metal salts of inorganic acids including those derived from such acids as carbonic, boric and phosphorous acids (other than an inorganic alkaline earth metal salt that has a water solubility of less than one gram of salt per 100 milliliters of water at 25° C. and other alkali metal dihydrogen phosphates and sulfates) ("Type B"); and C. salts of alkali and alkaline earth metals and carboxylic acids (including both monocarboxylic and polycarboxylic acids) ("Type C").

Illustrative of foam modifiers of Type A are potassium hydroxide, sodium hydroxide and lithium hydroxide and the sodium or potassium alkoxides of the base polyols described above. Preferred foam modifiers of Type A are potassium hydroxide and sodium hydroxide.

Illustrative of foam modifiers of Type B are trisodium and tripotassium phosphate, disodium or dipotassium hydrogen phosphate, sodium and potassium tetraborate and sodium and potassium carbonate. Preferred foam modifiers of Type B are sodium and potassium tetraborate and trisodium and tripotassium phosphate.

Illustrative of foam modifiers of Type C are sodium and potassium acetate, potassium and sodium hexoate, potassium and sodium chloroacetate, potassium and sodium dichloroacetate, lithium acetate, calcium acetate, potassium and sodium oleate, potassium and sodium salts of p-aminobenzoic acid, potassium or sodium salts of half-acids of succinic anhydride and an alkoxypolyethyleneoxyethanol, and potassium and sodium salts of half-acids derived from succinic anhydride and diethanolamine (by amidation) or dimethylaminoethoxyethanol (by esterification). Other modifiers of Type C are: (a) alkali or alkaline earth metal salts of polycarboxy-substituted polyethers such as the potassium salts of polyoxyalkylene oxides (which may be hydroxyl and/or alkoxy end blocked) grafted with acrylic or methacrylic acid; and (b) the ionomers described in Vogl et al., Journal of Polymer Science (Chemistry) 23 649, 673, 703 (1985).

Also illustrative of the foam modifiers of Type C are the alkali andd alkaline earth metal salts of carboxy organosiloxanes. Such salts include triorganosiloxy endblocked polyoxyalkylene siloxane polymers of the general formula:

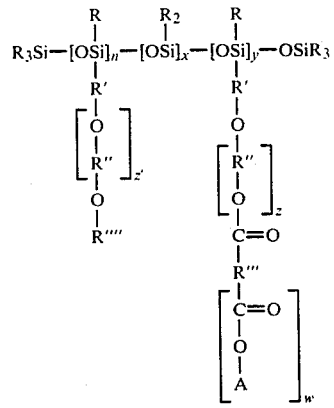

wherein:

R is selected from the group consisting of monovalent hydrocarbon and halogenated hydrocarbon radicals free of aliphatic unsaturation containing from 1 to 6 carbon atoms inclusive.

R' is a divalent hydrocarbon radical containing from 1 to 12 carbon atoms inclusive, R'' is a divalent hydrocarbon radical free of aliphatic unsaturation containing from 2 to 4 carbon atoms inclusive, R''' is selected from the group consisting of a divalent and trivalent hydrocarbon radical containing from 2 to 6 carbon atoms inclusive, R'''' is hydrogen, R or acyl, A is selected from the group consisting of the alkali and alkaline earth metals, n has a value of from 0 to 25 inclusive, x has a value of from 0 to 100 inclusive, y has a value of from 1 to 100 inclusive, z,z' has a value of from 0 to 100 inclusive, and w has a value of from 1 to 2 inclusive.

Preferred salts of this type are represented by the latter formula wherein R is a methyl radical, R' is a propylene radical, R'' is an ethylene and/or propylene radical, R''' is an ethylene radical, R'''' is hydrogen, a methyl radical or an acyl radical, the value of n is within the range of from 3 to 15, the value of x is within the range of from 0 to 25, the value of y is within the range of from 1 to 25, the value of z is within the range of from 1 to 20, and w is 1. These salts and a process for production thereof are disclosed in above-mentioned U.S. Pat. No. 3,560,544.

Preferred foam modifiers of Type C are compounds (salts of anhydride half-acids of polyols) produced by: (1) reacting, preferably in the presence of a basic catalyst, a cyclic anhydride of a dicarboxylic acid with one of the hydroxly groups of a base polyol (as described previously) to form a half-acid containing at least one hydroxyl group and one carboxylic acid group and (2) then reacting the carboxylic acid group with an alkali metal hydroxide to produce a salt of the carboxylic acid group. The preferred foam modifiers of Type C can alternatively be produced by: (1) reacting one hydroxyl group of a polyol with an alkali metal hydroxide to produce an alkoxide and (2) then reacting the alkoxide with a cyclic anhydride to produce a salt of an ester having carboxylic group derived from the anhydride. In making such preferred foam modifiers by either method, the base polyol employed is preferably polyalkylene oxide glycol or triol, the anhydride employed is preferably succinic or maleic anhydride, and the hydroxide employed is preferably sodium or potassium hydroxide.

Unexpectedly, it has been found that the foam modifiers employed in the process of this invention produce stable, flexible polyurethane foams, especially from formulations with high water concentrations, as well as molded foams that can be rapidly demolded with improved green strength. The foams also have improved combustion resistance. It has been found that such foams are not produced with other seemingly similar compounds such as phosphoric acid, acetic acid, chloroacetic acid, sodium chloride, potassium iodide, monobasic sodium phosphate, magnesium sulfate, zinc sulfate, choline 2-ethylhexanoate, calcium carbonate, calcium sulfate and calcium phosphate and the choline hydroxide salt of a succinic anhydride half-acid of a polyol.

The amount of a foam modifier used in the process this invention will range from about 0.01 to about 20 grams milliequivalents of foam modifier per 100 grams of the polyol. Preferably, from about 0.1 to about 10 gram milliequivalents of modifier per 100 grams of the polyol are used.

The foam modifier used in the process of this invention is usually employed dissolved, or stably dispersed, in a liquid medium. The liquid medium utilized is water, a polyol (including the above-described base polyols and polymer/polyols), a silicone surfactant or an amine catalyst. Compositions useful in accordance with the present invention will comprise a major amount of the liquid medium and a minor amount of foam modifier. Preferably the composition contains 0.1 to 40 parts by weight foam modifier per hundred parts by weight of the liquid medium. In some cases, the foam modifier is sufficiently soluble in the reaction mixture so that no such liquid medium is needed (see Example 1 below).

Water is used as a blowing agent in the process of this invention either alone or with an auxiliary blowing agent such as a halogenated hydrocarbon, (e.g., trichloromonofluoromethane, dichlorodifluoromethane, dichloromonofluoromethane, methylene chloride, trichloromethane, 1,1-dichloro-1-fluoroethane, 1,1,2-trichloro-1,2,2-trifluoroethane, hexafluoro-cyclobutane, octafluorocyclobutane, and the like). The quantity of blowing agent(s) employed will vary with factors such as density and hardness desired in the foamed product. The quantity of water used in the First Embodiment of this invention is set out above. The same quantity of water can be used in the Second Embodiment of this invention. Usually, however, the amount of water used in the Second Embodiment is from 2.5 to 10 parts by weight (preferably from 3 to 8 parts by weight) per 100 parts by weight of polyol.

The reaction mixtures (formulations) useful on preparing flexible polyurethane foams in the process of this invention can contain various optional ingredients. For example, the reaction mixtures of this invention usually contain one or more of the amino catalysts, metal catalysts, silicone surfactants and crosslinkers currently employed in the art of producing water-blown, flexible urethane foams.

Catalysts that can be used in producing the polyurethane foams in accordance with this invention include: tertiary amines, such as bis(N,N-di-methylaminoethyl)ether, trimethylamine, triethylamine, N-methylmorpholine, dimethylaminoethyl morpholine, N,N,N',N'-tetramethylhexanediamine, N-ethyl-morpholine, N,N-dimethylethanolamine, N,N,N'N'-tetramethyl-1,3-butanediamine, triethanolamine, 1,4-diazabicyclo[2.2.2]octane, pyrridine oxide, and the like. Preferred amine catalysts are bis(N,N-di-methylaminoethyl)ether and 1,4-diazabicyclo[2.2.2]octane. Illustrative of the amine catalysts used in the process of this invention are those sold by the Union Carbide Corporation has "NIAX" Catalysts C-229, 8154, C-220, and C-183; those sold by Air Products and Chemicals Inc. as "DABCO" 8l18, 33LV, and 8154; and those sold by Texaco Chemical Corporation as "THANCAT DD" and "THANCAT TD". The amine catalysts can be used dissolved in solvents (e.g., glycols such as dipropylene glycol) and can be partially neutralized (e.g., with a carboxylic acid such as formic acid). Metal (e.g., tin, lead and copper) salts or organo-metallic catalysts may be included in the formulations but are not generally required. Dibutyltin dimaleate, stannous octoate, dibutyltin dilaurate, dibutyltin dilauryl sulfide, and dibutyltin oxide are examples of such metal catalysts which may be used if desired. If used in the process of this invention, amine and/or metal catalysts are employed in small amounts, for example, from about 0.001 parts by weight to about 5 parts by weight of catalyst per 100 parts by weight of the polyol. A further advantage of the instant invention is the ability to use a reaction mixture essentially free of (e.g., containing less than 0.001 parts by weight per 100 parts by weight of the polyol) the heavy metal (e.g., tin, lead and copper) salts and heavy metal organo-metallic compounds often previously required as catalysts.

The crosslinkers that may be used in the process of this invention include the following compounds:

$$HO-CH_2-CH_2-\overset{H}{\underset{|}{N}}-CH_2-CH_2-OH$$

$$N(CH_2-CH_2OH)_3$$

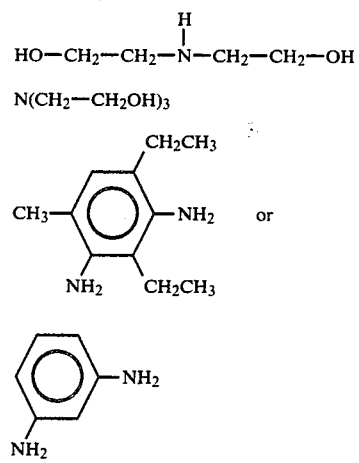

These crosslinkers are preferred in the reaction mixture in an amount from 0.01 to 20 parts by weight (more preferably from 0.5 to 3.0 parts by weight) per hundred parts by weight of the polyol.

The silicone surfactants that may be used in the process of this invention include "hydrolyzable" polysiloxane-polyoxyalkylene block copolymers or "non-hydrolyzable" polysiloxanepolyoxyalkylene block copolymers described in U.S. Pat. Nos. 2,834,748, 2,917,480; 3,505,377; 3,741,417; 3,887,483; 3,980,688; 4,025,452; and 4,071,493. Yet another useful class of silicone surfactants are cyanoalkylpolysiloxanes as described in U.S. Pat. Nos. 3,905,924, 3,952,038 and 4,003,847. Still other useful classes of silicone surfactants are polydimethylsiloxanes containing minor amounts of other silicon-bonded hydrocarbon substituents (e.g., beta-phenylethyl groups) described in U.S. Pat. Nos. 3,839,384 and 3,896,062. As is known in the art, the selection of a particular silicone surfactant for use in a particular foam formulation will depend on such properties as the reactivity of the polyol in the formulation and the like. Preferred silicone surfactants are those represented by the following formulas:

Me$_3$SiO(Me$_2$SiO)$_x$(MeSi(O)C$_n$H$_{2n}$C$_6$H$_5$)$_y$SiMe$_3$, where Me is a methyl group, x and y have values of 1 to 4, and n has a value of 2 to 3. These silicone surfactants are preferred for use in producing high resiliency slab and molded polyurethane foam.

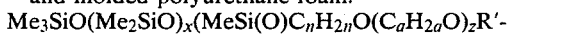
Me$_3$SiO(Me$_2$SiO)$_x$(MeSi(O)C$_n$H$_{2n}$O(C$_a$H$_{2a}$O)$_z$R''-')$_y$SiMe$_3$, where Me is a methyl group, x and y have values of 1 to 6, n has a value of 3 to 4, a has a value of 2 to 3, z has a value of 1 to 10, and R'' is equal to a lower alkyl or acyl group. These silicone surfactants are preferred for use in producing high resiliency slab and molded polyurethane foam.

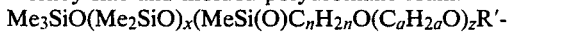
Me$_3$SiO(Me$_2$SiO)$_x$(MeSi(O)C$_n$H$_{2n}$O(C$_a$H$_{2a}$O)$_z$R''-')$_y$SiMe$_3$, where Me is a methyl group, x has a value between 40 and 200, y has a value of 5 to 20, n has a value of 3 or 4, a has a value of 2 to 3, z has a value of 20 to 80, and R'' is equal to a lower alkyl or acyl group. These silicone surfactants are preferred for use in producing conventional slab polyurethane foam.

The use of silicone surfactants in the process of this invention is important in those cases where fine cell structure is desired and to insure greater foam stability. The silicone surfactants can be used as such or dissolved in solvents such as glycols. The silicone surfactants which are useful in the process of this invention include those sold by Union Carbide Corporation as Y-10366, L-5312, L-5311, L-5750, L-5309, L-6202 and Y-10481; those sold by the Dow Corning Corporation as DC-190 and DC-5043 and those sold by Theodore Goldshmidt A.G. as "Tegostab B-4113, and BF-2370". Usually, the reaction mixture for molded foam contains from 0.1 to 5 parts by weight (preferably from 0.5 to 2.5 parts by weight) of a silicone surfactant per 100 parts by weight of the polyols. Usually, the reaction mixture for slab foam contains from 0.3 to 4 parts by weight (preferably from 0.7 to 2.5 parts by weight) of the silicone surfactant per hundred parts by weight of the polyol.

The process of this invention involves mixing, reacting and foaming the above starting materials by the conventional "one-shot" (one step) process. The temperature range useful for the process of this invention to produce polyurethane foams will vary depending on the type of foam to be prepared. Slab foams are made by mixing the starting materials at about room temperature. Molded foams are made by heating the molds to temperatures between about 35° C. to 70° C., preferably between about 40° C. to about 65° C., and adding the mixed starting materials to the heated molds. In both cases, the reaction exotherm may cause the foam temperature to rise to up to 165° C. The other process conditions and the equipment used to produce conventional slab and molded water-blown flexible polyurethane foam can be used in producing polyurethane foams in accordance with the process of this invention.

The flexible polyurethane foams produced in accordance with the process of this invention may have a higher closed cell content than may be desired for certain applications (i.e., the foams may be too "tight"). The number of open cells in the foams can be increased by incorporating in the reaction mixture used to produce the foam a minor amount of an alkanoic acid such as 2-ethylhexanoic acid. Preferably an amount of alkanoic acid up to one equivalent of acid per equivalent of the amine is employed.

The process of this invention produces polyurethane foams which are highly stable, capable of rapid demold with improved green strength and have enhanced resistance to combustion. With respect to stability, the slab foams produced in accordance with the process of this invention are stable at high water levels and the molded foams produced in accordance with the process of this invention have reduced "Vent Collapse" (as hereinafter defined). With respect to demold time and green strength, the molded foams produced by the process of this invention generally have demold times from 1.5 to 4.5 minutes (preferably from 2.5 to 4 minutes) with improved green strengths, as measured Puncture Cure values (as hereinafter defined) Puncture Cure values from 5 to 12 (preferably from 8 to 11) are usually obtained. With respect to resistance to combustion, the slab and molded polyurethane foams produced in accordance with the process of this invention pass the "CAL 117 TEST" and the "MVSS-302 TEST" (as hereinafter defined).

The flexible polyurethane foams produced according to the process of this invention will contain less than 5 mol-% isocyanurate groups (as measured by infrared spectroscopy) based on the isocyanato groups in which the polyisocyanate used to make the foam.

Without wishing to be bound by any particular theory, it appears that the improved foam stability achieved by the practice of the process of this invention (particularly the First Embodiment) are, at least in part, due to the fact that the foam modifier controls the reaction of the water in the reaction mixture (formulation) employed in the process of this invention so that the desired polyisocyanate-water and polyisocyanate-polyol reactions occur in the sequence which permits useful polyurethane foams to be produced. This reaction sequence is that the water reacts, in a controlled way, first with isocyanate with the evolution of carbon dioxide and heat to form an amine which subsequently reacts with more isocyanate to form urea. As the temperatures of the reaction mixture increases during foaming due to the exotheric reaction, temperature are reached at which the polyisocyanate-polyol reaction is activated to "gel" the foaming system without heavy metal (e.g., tin) catalysis being required. The importance of the controlled time sequence reactions during foaming is well documented in the literature. (See G. Rossmy, H. J. Kollmeier, W. Lidy, H. Shator and M. Wiemenn, *Journal of Cellular Products*, 17, 319 (1981); H. G. Kollmeier, G. Burkhart, J. Kleitsch and H. Lammerting, *Journal of Cellular Products*, 20, 410–415 (1984); F. E. Bailey, Jr. and F. E. Critchfield, *Journal of Cellular Plastics*, November/December, 1981, pgs. 333–339 and "Urethane Chemistry and Applications", K. N. Edwards, Ed. ACS Washington (1981), pgs. 125–147.)

Also without wishing to be bound by any particular theory, the present invention, particularly the First Embodiment, resides in the novel use of certain ionic compounds (foam modifiers) which appear to control the water reactivity and the reaction sequence and, in the process, enable the making of stable foams even from formulations with high water levels.

The flexible polyurethane foams produced in accordance with the process of the present invention are useful in the same areas as are flexible polyurethane foams produced by prior art processes (e.g., in packaging, insulation, mattresses, furniture, home and automotive cushions, car underlay, etc.).

The following Examples are presented to illustrate the present invention.

The terms of abbreviations used in the Examples have the following meaning:

| Term or Abbreviation | Meaning |
| --- | --- |
| PA* | A polyalkylene oxide triol produced from propylene and ethylene oxides and glycerine having an hydroxyl number of about 34. The ethylene oxide is present primarily in blocks and is used to "cap" the triol. Based on its alkylene oxide content, this triol contains about 85 wt. % $C_3H_6O$ and about 15 wt. % $C_2H_4O$. |
| PB* | A polyalkylene oxide triol, produced from propylene oxide and ethylene oxide and glycerine. The product contains about 8 wt. % of an internal ethylene oxide block and has an hydroxyl number of about 58. |
| PC* | A polyalkylene oxide triol produced from propylene and ethylene oxides and a dehydrated glycerine starter having an hydroxyl number of about 28. The ethylene oxide is present primarily in blocks and is used to "cap" the triol. Based on its alkylene oxide content, this triol contains about 83.5 wt. % $C_3H_6O$ and about 16.5 wt. % $C_2H_4O$. |
| PD* | A polyalkylene oxide triol produced from propylene and ethylene oxides and a dehydrated glycerine starter having an hydroxyl number of about 35.5. The ethylene oxide is present primarily in blocks and is used to "cap" the triol. Based on its alkylene oxide content, this triol contains about 83.5 wt. % $C_3H_6O$ and about 16.5 wt. % $C_2H_4O$. |
| PE* | A polyalkylene oxide triol produced from propylene and ethylene oxides and glycerine having an hydroxyl number of about 35.5. The ethylene oxide is present primarily in blocks and is used to "cap" the triol. Based on its alkylene oxide content, this triol contains about 83.5 wt. % $C_3H_6O$ and about 16.5 wt. % $C_2H_4O$. |
| PF* | A polyalkylene oxide polyol produced from propylene and ethylene oxides and a starter consisting of about 50/50 weight ratio of sorbitol/glycerine having an hydroxyl number of about 28. The ethylene oxide is present primarily in blocks and is used to "cap" the polyol. Based on its alkylene oxide content, this triol contains about 85 wt. % $C_3H_6O$ and about 15 wt. % $C_2H_4O$. |
| PG* | A polyalkylene oxide triol produced from propylene and ethylene oxides and a dehydrated glycerine starter hydroxyl number of about 28. The ethylene oxide is present primarily in blocks and is used to "cap" the polyol. Based on its alkylene oxide content, this triol contains about 88–93 wt. % $C_3H_6O$ and about 7–8 wt. % $C_2H_4O$. |
| PH* | A polyalkylene oxide hexol, produced from propylene oxide and ethylene oxide and a dehydrated sorbitol starter. The product contains about 10 wt. % of an internal ethylene oxide block and has an hydroxyl number of about 28. |
| DSA | A polymer/polyol dispersion stabilizer, which is the reaction product of polyol PA with 1.0% to 2.0% maleic anhydride, capped with ethylene oxide and the retained unsaturation being of the fumarate type. |
| DSB | A polymer/polyol dispersion stabilizer, which is the reaction product of polyol PH with 0.5% to 1.5% maleic anhydride, capped with propylene oxide and the retained unsaturation being of the fumarate type. |
| PPA | A polymer/polyol sold as "NIAX Polyol E-515" by Union Carbide Corporation having at least 70 mol % primary hydroxyl groups, a hydroxyl number of 21 and containing about 30 wt. % polymer derived from acrylonitrile and styrene. |
| PPB | A polymer/polyol sold as "NIAX Polyol E-519" by Union Carbide Corporation having at least 70 mol % primary hydroxyl groups, a hydroxyl number of 25 and containing about 30 wt. % polymer derived from acrylonitrile and styrene. |
| PPC | A polymer/polyol sold as "NIAX Polyol E-585" by Union Carbide Corporation having at least 70 mol % primary hydroxyl groups and a hydroxyl number of 21. |
| PPD | A polymer/polyol sold as "NIAX Polyol E-513" by Union Carbide Corporation having at least 70 mol % primary hydroxyl groups, a hydroxyl number of 25 and about 20 wt. % polymer derived from acrylonitrile and styrene. |
| PPE | A polymer/polyol sold as "NIAX Polyol 31-28" by Union Carbide Corporation having at least 70 mol % primary hydroxyl groups, a hydroxyl number of 28 and about 20 wt. % polymer derived from acrylonitrile. |
| PPF | A polymer/polyol sold as "NIAX Polyol E-579" by Union Carbide Corporation having at least 70 mol % secondary hydroxyl groups, a hydroxyl number of 29 and about 40 wt. % polymer derived from acrylonitrile and styrene. |
| PPG | A polymer/polyol containing about 76 wt. % of PD (containing a stabilizing amount of DSA) and about 24 wt. % of a dispersed poly(p-methylstyrene) polymer. |
| PPH | A polymer/polyol containing about 72 wt. % of PC (containing a stabilizing amount of DSB) and about 28 wt. % of a dispersed polymer phase having a weight ratio of about 33/67 acrylonitrile/styrene. |
| PPI | A polymer/polyol containing about 72 wt. % of PG (containing a stabilizing amount of DSA) and about 28 wt. % of a dispersed polymer phase having a weight ratio of about 33/67 |

-continued

| Term or Abbreviation | Meaning |
|---|---|
| | acrylonitrile/styrene. |
| PPJ | A polymer/polyol containing about 40 wt. % PPC and about 60 wt. % PF. |
| S-1 | Nonionic Surfactant-An alkoxypoly-ethyleneoxyethanol in which the alkoxy group is principally (ca. 50 wt. %) $C_{12}$-$C_{14}$ and which has a number average molecular weight of about 500. |
| S-2 | A silicone surfactant sold for use in high resiliency foam by Union Carbide Corporation as "Y-10366". |
| S-3 | A silicone surfactant sold for use in high resiliency foam by Union Carbide Corporation as "L-5312". |
| S-4 | A silicone surfactant sold for use in high resiliency foam by Union Carbide Corporation as "L-5311". |
| S-5 | A silicone surfactant sold for use in conventional foam by Union Carbide Corporation as "L-5750". |
| S-6 | A silicone surfactant sold for use in high resiliency foam by Union Carbide Corporation as "L-5309". |
| S-7 | A silicone surfactant sold by Union Carbide Corporation as "L-6202". |
| S-8 | A silicone surfactant sold by Union Carbide Corporations "Y-10481". |
| F-1 | A polyether monol fluid produced from n-butanol, ethylene oxide and propylene oxide. The oxide units are randomly distributed along the polyether chain. The fluid has an SUS viscosity of 5100 at 100° F. |
| F-2 | A polyether fluid lubricant which is 10 wt. % of acrylic acid grafted onto a base fluid F-1. |
| K-1 | A mixture of 70 wt. % bis(dimethyl-aminoethyl)ether and 30 wt. % dipropylene glycol. |
| K-2 | A polyurethane foam amine catalyst sold as "NIAX Catalyst A-107" by Union Carbide Corporation. |
| K-3 | A mixture of 33 wt. % 1,4-diazabicyclo(2.2.2)-octane and 67 wt. % dipropylene glycol. |
| K-4 | A polyurethane foam amine catalyst sold as "DABCO 8118" by Air Products and Chemicals Incorporated. |
| K-5 | A polyurethane foam amine catalyst sold as "NIAX Catalyst C-229" by Union Carbide Corporation. |
| K-6 | A polyurethane foam amine catalyst commercially available as "DABCO 8154" by Air Products and Chemicals Incorporated. |
| K-7 | A polyurethane amine catalyst sold as "NIAX Catalyst C-220" by Union Carbide Corporation. |
| K-8 | A polyurethane amine catalyst sold as "NIAX Catalyst C-183" by Union Carbide Corporation. |
| K-9 | Stannous octoate (50 wt. %) in di-(2-ethylhexyl)-phthalate (50 wt. %). |
| "Thermolin 101" | A flame retardant which has the structure: $$[(Cl-CH_2-CH_2-O)_2-\overset{O}{\underset{\|}{P}}-O-CH_2]_2$$ and which is sold by the Olin Corporation |
| TDI | A mixture of 80 wt. % 2,4-tolylene diisocyanate and 20 wt. % 2,6-tolylene diisocyanate. |
| "VAZO 64" | Azobisisobutyronitrile |
| MT40 | A blend by weight of TDI and "MONDUR MRS" (a commercially available MDI from Mobay Chemical Corporation) having a free NCO content of 39.9 wt. %. |

-continued

| Term or Abbreviation | Meaning |
|---|---|
| DEOA | Diethanolamine |
| DMEE | Dimethylaminoethoxyethanol |
| BHT | Butylated hydroxy toluene |
| g | Grams |
| mg | Milligrams |
| in. | Inch |
| % | Percent (by weight unless otherwise indicated) |
| wt. | Weight |
| php | Parts by weight per 100 parts by weight |
| sec. | Seconds |
| lb. | Pounds |
| M | Mols |
| °F. | Degree Fahrenheit |
| °C. | Degree Centigrade |
| CFM | Cubic feet per minute |
| Cu. ft. | Cubic feet |
| ppm | Parts by weight per million parts by weight |
| psi | Pounds per square inch gauge |

*All the polyols that were capped with ethylene oxide had at least 70 mol % primary hydroxyl groups and the other polyols (PB and PH) had at least 70 mol % secondary hydroxyl groups based on the total hydroxyl groups in the polyols.

General Procedure

Unless otherwise indicated in the Examples, the polurethane foams were prepared according the general procedure described in "Urethane Chemistry and Applications", K. N. Edwards, Ed., *American Chemical Society Symposium Series No.*, 172, A.C.S., Washington, D.C. (1981) pg. 130 and *J. Cellular Plastics*, November/December 1981, pgs. 333-334 The basic steps in this procedures for mixing and foaming of water-blown polyurethane foam on a laboratory scale are:

1. The formulation ingredients are weighed and made ready to be added in the predetermined sequence to the mixing container.

2. The formulation ingredients are mixed intensively, allowed to "degas" for a prescribed time and an auxiliary blowing agent, other than water, may be added (if such auxiliary agent is used).

3. Polyisocyanate is added and the formulation is mixed again.

Then step 4 and 5 are followed for slab foam or steps 4, 5, 6 and, except when the Puncture Cure test (as hereinafter defined) is conducted, 7 are followed for molded foam.

4. The mixed formulation is poured quickly into either an open-topped container such as an open-topped paper box for slab foam or into a preconditioned mold (previously treated with a mold-release agent) and heated to mold-temperature indicated below. "Cream Time" is the time from the addition of isocyanate to the time a visible movement or expansion of the foam mixture begins. "Rise Time" is the time from the addition of the polyisocyanate to the time when there is a noticeable "blow-off" (evolution) of carbon dioxide from the foam surface or the rate of rise has slowed to less than 1/10 inch per minute.

5. (a) After the rise is complete, the foam is allowed to stand at ambient temperature for at least 24 hours before being tested. (b) The molds used are constructed with four vents or ports near the four corners. "Exit Time" is the time at which an extrusion of foam can be seen coming from these ports or vents.

6. The mold is placed in an oven to keep it hot while the foam cures, usually 5 to 8 minutes. "Demold Time"

is the time from the time step 3 above is performed to the time the mold is opened and the foam is removed from the mold.

7. Molded foams are crushed to open the cells of the foam and prevent shrinkage. Crushing is done by hand or with mechanical rollers.

Testing Procedures

Test methods used to determine the physical characteristics of the foams produced in the Examples were conducted as follows:

| Physical Characteristic | Test Method |
|---|---|
| Density | ASTM D 3574 Test A |
| Elongation | ASTM D 3574 Test E |
| Resilience | ASTM D 3574 Test E |
| IFD | ASTM D 3574 Test B1 and Test B2 |
| Tensile | ASTM D 3574 Test E |
| Tear Resistance | ASTM D 3574 Test F |
| Porosity | ASTM D 3574 Test G |
| Return Value | ASTM D 3574 Test B1 and Test B2 |
| Load Ratio | ASTM D 3574 Test B1 and Test B2 |
| CFD | ASTM D 3574 Test C |
| Humid Age, load loss | ASTM D 3574 Test D |
| Humid Age, Compression set | ASTM D 3574 Test D |
| Port Rating (Vent Collapse) | SPI Proceedings of the 28th Annual Technical/Marketing Conference November 5–7, 1985, pgs. 86–91. Foam stability as rated by the sum of the diameters of collapse at the four vents. This procedure results in a numerical rating for a particular molded foam. |
| Puncture Cure | Foam is demolded without crushing and is immediately placed on a "Load" Instron and the test is started one minute after demold. The Instron indenter foot has been replaced with a drill chuck holding an eight inch by ¼ inch steel rod, flat at the bottom end. The Instron is run at the fast (60 in./min.) speed taking five readings, one half-way between center and edge. The maximum force is recorded at puncture through the skin. Typical readings range from 6 for weak foam to 9 for strong foam. |
| CAL 117 Test (Char & After flame) | State of California Test Method No. CCC-T-1916 Method 5903 |
| MVSS-302 Test | U.S. Federal Motor Vehicle Safety Standard MVSS-302 |
| Pad wt. | The weight of the foam removed from the mold. |
| Extrusion wt. | The foam mold has ports near the four corners of the top of the mold. When the mold fills with foam, some foam extrudes from these ports. These extrusions are broken off and weighted to determine the extrusion weight. |

EXAMPLE 1

Preparation of Foam Modifier from Polyol PC

A. Polyol PC (11,606 g) was charged to a four-necked, 22-liter reaction vessel and heated in a heating mantle with stirring under nitrogen to 41° C. At this point 169.4 grams of succinic anhydride were added to the reaction vessel with continued heating and stirring. At 50° C., a catalytic amount of KOH (2.69 grams) was added with continued heating and stirring. The temperature was allowed to reach 148° C. and then held at 148° C. for one and one-half hours to produce a succinic anhydride half-acid of polyol PC. The reaction vessel and contents were then allowed to cool under nitrogen. A sample of the half-acid so produced was taken and the acid number was determined using a Mettler Memotitrator. The theoretical acid number for the half-acid based on charge to the reactor was 8.06 mg. KOH/gram of sample. The acid number was determined to be 7.959 mg. KOH/gram of sample confirming the formation of the half-acid.

B. Alcoholic KOH was prepared by dissolving 110.5 g of KOH in 796.9 grams of methanol. The alcoholic KOH so prepared was added with intensified stirring to the reaction vessel containing the half-acid produced as described in (A) above. The contents of the reaction vessel were stirred for an additional hour and then the acid number was determined again and the contents were found to be essentially neutralized. To remove volatiles, the neutralized product was first heated to 75° C. with vacuum and a small nitrogen purge and then the temperature was increased to 100° C. and held there for two and one half hours. The 11,846 g. of the final reaction product so produced was the potassium salt of the succinic anhydride half-acid of Polyol PC which had about one $COO^-K^+$ group and two hydroxyl groups per molecule and which had the following analysis:

| Hydroxyl Number | 21.8 mg KOH/g. |
|---|---|
| Oxyethylene, wt. % | 15.5 |
| Acidity | 0.303 mg. KOH/g. |

EXAMPLE 2

Preparation of Foam Modifier from Polyol PA

Following the same procedure as described in Example 1, a foam modifier was prepared based on polyol PA. The preparation was carried out in a 4 neck, five liter stirred reaction vessel. The PA-succinic anhydride mixture was stirred at 60° C. under a blanket of nitrogen and then heated to 145° C. with stirring and held at temperature for one and one-half hours to produce the half-acid. The half-acid was then allowed to cool to room temperature. A sample of the half-acid so produced was taken and the acid number was determined using a Mettler Memotitrator. The theoretical acid number based on charge to the reactor is 12 mg. KOH/g of sample. The acid number was determined to be 11.29 mg. KOH/g of sample confirming the formation of the half-acid. To neutralize the half-acid, 1479 cc. of 0.5N. KOH in methanol was added. The neutralized product was stripped and the acid number of the stripped product was determined to be 0.047 mg. KOH/g. of product. The final reaction product so produced was the potassium salt of the succinic anhydride half-acid of Polyol PA which had about one COO⁻K⁺ group and two hydroxyl groups per molecule.

EXAMPLE 3

Preparation of Foam Modifier Based on Polyol PB

To a 5-liter, 4-neck, round-bottom, glass reaction vessel fitted with stirrer, thermocouple, and blanketed with nitrogen, there was charged 2000 g of polyol PB with a hydroxyl number of 57.9. To this reaction vessel there was added 68.85 grams of succinic anhydride and catalytic amount of flake KOH (200 ppm, 0.41 grams). The reactants were stirred under nitrogen while being heated to 145° C. The reactants were held at this temperature with stirring for one and one-half hours to produce the half-acid. A sample of the half-acid so produced was taken and the acid number was determined using a Mettler Memotitrator. The theoretical acid number based on charge to the reactor is 19.3 mg. KOH/g of sample. The acid number was determined to be 18.88 mg. KOH/g of sample confirming the formation of the half-acid. To neutralize the half-acid, 1392 cc. of 0.5N. KOH is methanol was added. The neutralized product was stripped and the acid number of the stripped product was determined to be 0.856 mg. KOH/g of product. The final reaction product so produced was the potassium salt of the succinic anhydride half-acid of polyol PB which had about one COO⁻K⁺ group and two hydroxyl groups per molecule.

EXAMPLE 4

Preparation of a Foam Modifier from Oleic Acid 1187 grams of polyol PC (used as the reaction medium in this Example) was charged to a four-neck, round bottom glass reaction flask as in Examples 1 to 3. 47.48 grams of oleic acid was mixed with the polyol. The acid number was measured to be 7.84 mg. KOH/g. The oleic acid in this solution was neutralized with 10.6 grams of KOH in 150 ml. of methanol. The products was stripped under vacuum at 120° C. and cooled to room temperature. The product separated into two phases, the polyol and a soft, flocculous precipitate (potassium oleate) which could be kept dispersed in the polyol with slow agitation.

EXAMPLE 5

Preparation of a Foam Modifier from p-Aminobenzoic Acid

Following the procedure of Example 4, 1000 grams of polyol PC (used as the reaction medium in this Example) was charged to a reaction vessel and 19.6 grams of p-aminobenzoic acid was dissolved in the polyol. The acid number was measured to be 8.02 mg. KOH/g. This solution was neutralized with 9.0 grams of KOH in 300 ml. of methanol. The final acid number after stripping was 0.04 mg. KOH/g. The product appeared to be a very fine, stable dispersion of the potassium salt of p-aminobenzoic acid in the polyol.

EXAMPLE 6

Preparation of a Foam Modifier Based on Nonionic Surfactant S-1

To a 3 liter, 4 necked reaction vessel was charged 100 grams of the monol S-1 (hydroxyl number 115 and water content 0.11%), a catalytic amount of KOH (200 ppm) and succinic anhydride (20.51 g.). The reaction vessel was heated at 100° C. for one hour with the contents stirring under nitrogen to produce a half-acid. Polyol PC was added to dilute the contents of the reaction vessel. The contents of the reaction vessel were then neutralized with methanolic KOH. The methanol and water were then "stripped" (volatilized) from the vessel to produce Foam Modifier 1 (which was the potassium salt of the half-acid of succinic anhydride and S-1) dissolved in polyol PC. The preparation was repeated on a larger scale to prepare Foam Modifier 2. The amounts of each material are listed below.

| Material | Foam Modifier 1 | Foam Modifier 2 |
|---|---|---|
| S-1 | 100 g. | 1000 g. |
| KOH | 0.02 g. | 0.2 g. |
| Succinic Anhydride | 20.51 g. | 205.1 g. |
| PC | 1317 g. | 13170 g. |
| Acid number, mg. KOH/g. | 8.66 | 8.5 |
| KOH (for neutralization) | 13.82 g. | 138.5 g. |

EXAMPLE 7

Preparation of a Foam Modifier from F-2

A. F-2 (16.8 grams) was added to a 500 ml. reaction vessel equipped with stirrer, heating mantle, thermometer and a means for passing a blanket of nitrogen over the contents of the vessel. Polyol PC (134 grams) was then added to the reaction vessel as a reaction medium and the contents of the vessel were then stirred for 15 minutes. An 8.3 gram sample of the contents of the vessel was removed and the acid number of the sample was determined to be 7.9 mg KOH/g, using a Mettler Memotitrator. The contents of the reaction vessel were neutralized with 1.26 grams of KOH dissolved in 10 g. of methanol and then methanol and water were volatized from the vessel. The acid number of the contents of the reaction vessel at this point was found to be 0.116 mg. KOH/g., confirming that essentially all the acrylic acid groups of the F-2 had been converted to potassium acrylate groups.

B. The above procedure was repeated to make a larger quantity of this foam modifier using 317.8 grams of F-2 diluted in 2,542.4 grams polyol PC and neutralized with a stoichiometric amount of methanolic KOH.

EXAMPLE 8

Preparation of a Foam Modifier-Polymer/Polyol

A. A "foam modifier-polymer/polyol" utilized in this Example was made from about 71 wt. % of a mixture of PC, DSA and the foam modifier of Example 1 above and about 29 wt. % acrylonitrile/styrene in a weight ratio of 70/30. These materials, isopropanol and "VAZO 64" catalyst were fed to a laboratory 500 ml. back-mixed, continuous reactor. The reactor was operated at 125° C. at 45 psi with a residence time of 12 minutes. The materials fed to the reactor were as follows:

| | |
|---|---|
| Acrylonitrile | 852.4 g. |
| Styrene | 1988.9 g. |
| "VAZO 64" | 67.38 g. |
| PC | 4856.3 g. |
| Foam Modifier | 994.7 g. |
| DSA | 578.7 g. |
| Isopropanol | 286.7 g. |

The product was collected after the feeds had been adjusted to the desired rates and a total of 3915 grams of product was obtained after volatiles were stripped under vacuum. BHT antioxidant (500 ppm) was added to the product. The product so formed was a stable, off-white dispersion of foam modifer-polymer/polyol.

B. Using the general procedure outlined above for preparing foams, a slab foam was prepared employing the formulation shown below using the foam modifier-polymer/polyol produced in A above. An Isocyanate Index of 100 (using TDI) was utilized in the formulation.

| FORMULATION | |
|---|---|
| Material | Amount (php) |
| PC | 50 |
| Foam Modifier - Polymer/polyol | 50 |
| Water | 6.0 |
| DEOA | 1.25 |
| K-2 | 0.3 |
| K-3 | 0.25 |
| S-2 | 1.5 |

After intensive mixing, the formulation was poured into an open-topped paper box. A stable, flexible polyurethane foam was obtained. In a similar formulation with the foam modifier-polymer/polyol replaced with PPA, the foam collapsed.

EXAMPLE 9

Preparation of a Foam Modifier-Polymer/Polyol

A. The foam modifier used in this Example was the foam modifier of Example 1, except that maleic anhydride was used in place of succinic anhydride and 0.3 mol of maleic anhydride per mol of OH in polyol PC was used in making the foam modifier in this Example. The final product (i.e., the potassium salt of the maleic anhydride half-acid of polyol PC) had an acid number of 0.064 mg. KOH/g.

Following the procedure of Example 8, a foam modifier-polymer/polyol was produced from the following materials:

| Acrylonitrile | 817.3 g. |
|---|---|
| Styrene | 1906.2 g. |
| "VAZO 64" | 67.4 g. |
| PC | 4656 g. |
| Foam Modifier | 953.6 g. |
| DSA | 554.8 g. |
| Isopropanol | 286.7 g. |

After the feeds to the reactor had been adjusted to the desired rates, the reaction product (foam modifier-polymer/polyol) was collected and stripped of volatiles. BHT (500 ppm) was then added to the 4084 grams of final reaction product as an antioxidant.

B. Using the general procedure outlined above for preparing foams, a flexible polyurethane slab foam was prepared from the formulation shown below using the foam modifier-polymer/polyol product of A above. An Isocyanate Index of 100 (using TDI) was utilized in the formulation below:

| FORMULATION | |
|---|---|
| Material | Amount (php) |
| PC | 50 |
| Foam Modifier - Polymer/Polyol | 50 |
| Water | 6.0 |
| DEOA | 1.25 |
| K-2 | 0.3 |
| K-3 | 0.25 |
| S-2 | 1.50 |

After intensive mixing, a stable flexible polyurethane foam was obtained with a rise time of 52 seconds. In a similar formulation, with the foam modifier-polymer/polyol replaced with PPA, the foam collapsed.

EXAMPLE 10

Preparation of Foam Modifiers from Amine Catalysts

A. Succinic anhydride (15 grams) and DEOA (15.7 grams) were charged to a 500 ml., round bottom, four necked flask fitted with thermometer, stirrer and means for keeping the contents under a blanket of nitrogen. The flask and contents were heated with stirring at 100° C. for one hour to produce a half acid amide. The flask and contents were allowed to cool and the 28.3 grams of the contents were poured into a 5 liter reaction flask, fitted with thermometer, stirrer and a means for maintaining a nitrogen blanket. Polyol PC (937.6 grams) was added to the reaction vessel as a reaction medium and the vessel was heated to 79° C. The vessel and contents were allowed to cool. The acid number of the contents of the reaction vessel was determined with a Mettler Memotitrator to be 1.98 mg. KOH/g. This acid number was lower than expected. Nonetheless, the contents of the vessel was neutralized with 8.5 grams of flake (90%) potassium hydroxide in 52.1 grams of methanol. The reaction vessel was heated to 70° C. and then the contents were stripped under vacuum. The contents then had an acid number of 0.72 mg. KOH/g. confirming the formation of the potassium salt of the succinic half-acid amide of DEOA.

B. Succinic anhydride (7.1 grams) and DMEE (9.5 grams) were charged to a 500 ml flask equipped as in A above and heated at 100° C. for one hour to produce a half acid of DMEE. The flask and contents were allowed to cool and 14.7 grams of the contents were transferred to a 3 liter, glass, 4-necked flask. Polyol PC (428.3 grams) was added to the flask as a reaction medium and the flask was heated to 60° C. The flask and contents were allowed to cool and the acid number of the contents was determined to be 8.87 mg KOH/g. The contents were then neutralized with 49.92 grams of flake KOH (90%) in methanol. After stripping, the acid number of the contents was determined and the contents were found to be essentially neutralizedd, confirming the formation of the potassium salt of the succinic anhydride half-acid ester of DMEE.

C. Using the general procedure outlined above for preparing foams, slab foams were prepared using the foam modifiers of A and B above in the formulations shown below. An Isocyanate Index of 100 (using TDI) was utilized in the formulations.

| | FORMULATION | |
|---|---|---|
| Material | Form 1 (php) | Form 2 (php) |
| PC | 80 | 80 |
| PPA | 20 | 20 |
| Foam Modifier From A | 3 | — |
| Foam Modifier From B | — | 3 |
| Water | 6 | 6.1 |
| DEOA | 1.25 | 1.25 |
| K-2 | 0.3 | 0.3 |
| K-3 | 0.25 | 0.25 |
| S-2 | 1.5 | 1.5 |

After intensive mixing, the formulations were poured into open-topped paper boxes. Stable flexible polyurethane foams were obtained with both formulations although the foam produced from Formulation 2, upon cooling, suffered considered side shrinkage. Rise times were 67 seconds and 50 seconds for Formulations 1 and 2, respectively. In a similar formulation with out the foam modifiers the foam collapsed.

EXAMPLE 11

Molded Foams Prepared Using The Foam Modifier of Example 2

Using the general procedure outlined above for preparing molded foams, two foams were prepared utilizing the foam modifier of Example 2 in formulations shown below which had different water contents. Stable flexible polyurethane foams were prepared exhibiting excellent combustion resistance. An Isocyanate Index of 130 (using TDI) was utilized in each formulation.

| | Foam Formulations | |
|---|---|---|
| Ingredient | Foam 1 (php) | Foam 2 (php) |
| PD | 58.5 | 57.5 |
| PPB | 40 | 40 |
| Foam Modifier | 1.5 | 2.5 |
| Water | 3.0 | 4.0 |
| DEOA | 1.5 | 2.0 |
| K-4 | 0.5 | 0.1 |
| K-2 | 0.5 | — |
| K-5 | — | 0.35 |
| Dibutyltindilaurate | 0.005 | 0.005 |
| S-3 | 1.8 | — |
| S-2 | — | 2.0 |

These foams (Foam 1 and Foam 2) had the following physical characteristics:

| | Foam 1 | Foam 2 |
|---|---|---|
| Density, lb./cu. ft. | 2.09 | 1.75 |
| Resilience, % | 64 | 60 |
| IFD 25%, psi. | 49.5 | 61.2 |
| 65%, psi. | 87.8 | 165 |
| Tensile, psi. | 17.5 | 16.2 |
| Elongation, % | 70.1 | 45.2 |
| Tear Resistance, psi. | 1.0 | 0.8 |
| Humid Age, Compression Set, % | 55.9 | 82.5 |

Federal Motor Vehicle Safety Standard MVSS-302 Test with these foams gave the following results:

| | Foam 1 | Foam 2 |
|---|---|---|
| Total Burn Length in Horizontal Burn Test, inches: (3 trials) | 1.6 1.5 1.5 | 0.6 0.6 0.7 |

These results show that both foams easily passed the MVSS-302 Test for combustion resistance and would be characterized as Self-extinguishing, No Burn Rate (SENBR) as that term is used in the MVSS-302 Test. At this Isocyanate Index and these water levels, it is difficult to make a comparable control foam (i.e., a foam without a foam modifier).

EXAMPLE 12

Molded Foam Using The Foam Modifier of Example 2

Using the general procedure outlined above for preparing foams, three foams were prepared to demonstrate improvements resulting from the use of the foam modifier of Example 2. These three foams were:

(i) "Standard"—a comparative conventional foam formulation commercially used for automobile seat backs.

(ii) "Rapid Demold"—a comparative experimental foam formulation for automotive seat backing designed to optimize and shorten demold time.

(iii) "Foam Modifier"—a foam formulation for automotive seat backing in accordance with the present invention containing the foam modifier of Example 2.

A Isocyanate Index of 100 (using TDI) was utilized in each foam formulation below.

| | BACK FORMULATIONS | | |
|---|---|---|---|
| Ingredient | Standard (php) | Rapid Demold (php) | Foam Modifier (php) |
| PE | 60 | — | — |
| PPD | 40 | — | — |
| PC | — | 60 | 57.9 |
| PPA | — | 26.7 | 26.7 |
| PPC | — | 13.3 | 13.3 |
| Foam Modifier | — | — | 2.1 |
| DEOA | 1.53 | 1.25 | 1.25 |
| Water | 3.5 | 4.5 | 4.5 |
| K-1 | 0.15 | — | — |
| K-2 | — | 0.3 | 0.3 |
| K-3 | — | 0.23 | 0.23 |
| K-4 | 0.6 | — | — |
| K-5 | — | 0.25 | 0.25 |
| Dibutyltindilaurate | 0.0065 | 0.01 | 0.0 |
| S-3 | 1.8 | — | — |
| Trichlorofluoromethane | 8.0 | — | — |
| S-8 | — | 1.52 | 1.52 |

The physical characteristics of these foams were:

| | | | |
|---|---|---|---|
| Density, lb./cu. ft. | 1.66 | 1.66 | 1.7 |
| Resiliency, % | 70 | 66 | 70 |
| Porosity, CFM/ft. | 48 | 43 | 54 |
| IFD, 25%, psi | 18 | 19 | 18 |
| IFD, 50%, psi. | 34 | 35 | 32 |
| IFD, 65%, psi. | 54 | 54 | 51 |
| Return Value, % | 81 | 82 | 83 |
| Load Ratio 65/25 | 3.0 | 2.82 | 2.85 |
| CFD, 50%, psi. | 0.28 | 0.3 | 0.28 |
| Tensile, psi. | 17 | 12.6 | 13.5 |
| Elongation, % | 98 | 106 | 114.8 |
| Tear, psi. | 1.22 | 1.27 | 1.21 |
| Compression | 17 | 49 | 80.8 |

| | | | |
|---|---|---|---|
| set, 75%, % | | | |
| Humid Age, Load Loss, % | 3.6 | 10 | 57.1 |
| Humid Age, Compression set, % | 37 | 39.6 | 59.4 |
| Molding Parameters: | | | |
| Demold Time, minutes: | 8 | 3.5 | 3.5 |
| Cream Time, sec. | 4 | 8 | 8 |
| Exit Time, sec. | 39 | 42 | 40 |
| Weight, grams | 474 | 475 | 482 |
| Port Rating, sec. | 1 | 2 | 0 |
| Puncture Cure, lb. | 9.4 | 8.5 | 10.9 |

These results demonstrate that the molded flexible polyurethane foam prepared in accordance with the present invention had both a rapid demold time and its puncture cure value was the highest of the three foams tested.

EXAMPLE 13

Slab Foam Foam Using Modifier of Example 3

An Isocyanate Index of 130 (using TDI) was utilized in the foam formulation below.

| | Foam Formulation (php) |
|---|---|
| PPG | 100 |
| Foam Modifier | 10 |
| Water | 3 |
| DEOA | 2.0 |
| S-5 | 1.0 |
| Stannous Octoate | 0.05 |

The above materials were mixed as follows: the PPG, water, foam modifier, DEOA and S-5 were vigorously mixed for 60 seconds. This mixture was then allowed to degas for 15 seconds. The stannous octoate was added to the mixture and the mixture was stirred for 10 seconds. The TDI was then added to the mixture and stirred for a final 5 seconds. The mixture which was beginning to foam at the end of the mixing cycle was poured as quickly as possible into an open-topped paper box. The foam rose, stood and cured in place. Visible inspection of the foam so formed showed the foam was of good quality.

EXAMPLE 14

Slab Foam Using Foam Modifier of Example 3

Using the general procedure outlined above for preparing foams, three slab foams were prepared. The three foams were prepared from the following formulations:

(1) a comparative conventional foam formulation for slab cushioning;

(2) a foam formulation for slab cushioning according to the present invention utilizing the foam modifier of Example 3; and (3) the comparative conventional foam formulation for slab cushioning of (1) plus a flame retardant ("Thermolin 101"). An Isocyanate Index of 120 (using TDI) was utilized in all three foam formulations which are shown below.

| | SLAB FORMULATIONS | | |
|---|---|---|---|
| Materials | Foam 1 (php) | Foam 2 (php) | Foam 3 (php) |
| PPJ | 100 | 100 | 100 |
| Water | 3.75 | 3.75 | 3.75 |
| DEOA | 1.15 | 1.15 | 1.15 |
| K-1 | 0.075 | 0.075 | 0.075 |
| S-6 | 1.0 | 1.0 | 1.0 |
| Stannous Octoate | 0.125 | 0.2 | 0.125 |
| "Thermolin 101" | — | — | 1.0 |
| Foam Modifier | — | 1.0 | — |

The foams were stable and could be cut the day after their preparation. The following porosities were measured on each foam:

| | Foam 1 | Foam 2 | Foam 3 |
|---|---|---|---|
| Porosity, CFM/ft. | 78 | 76 | 71 |

Cal 117 Tests were run on each foam with the following results:

| CAL 117 Test | Foam 1 | Foam 2 | Foam 3 |
|---|---|---|---|
| Char (inches) | 12 | 3.6 | 8.2 |
| After-flame (seconds) | 10 | 0 | 5.4 |

The foam (Foam 2) made with the foam modifier in accordance with this invention and without any added fire-retardant was clearly superior in combustion resistance.

EXAMPLE 15

Molded Foam With a High Water Formulation Using a Foam Modifier

Molded foams were made with mold temperature of 144° F. in which Vent Collapse was observed with a conventional formulation (Foam 2) while no Vent Collapse was observed with a formulation (Foam 1) utilizing a foam modifier similar to the modifier of Example 1, except that 0.3 mol of succinic anhydride per mol of OH in polyol PC was used to make the modifier used in this Example. An Isocyanate Index of 100 (using TDI) was utilized in each formulation which are shown below.

| | FORMULATIONS | |
|---|---|---|
| Materials | Foam 1 (php) | Foam 2 (php) |
| PC | 80 | 80 |
| PPA | 13 | 13 |
| PPC | 7 | 7 |
| Water | 5.2 | 5.2 |
| DEOA | 1.25 | 1.25 |
| K-2 | 0.3 | 0.3 |
| K-3 | 0.23 | 0.23 |
| K-5 | 0.25 | 0.25 |
| S-2 | 1.5 | 2.0 |
| Foam Modifier | 5.0 | — |

The following properties were observed:

| | Foam 1 | Foam 2 |
|---|---|---|
| Exit Time (observed) | 42 seconds | 48 seconds |

-continued

| | Foam 1 | Foam 2 |
|---|---|---|
| Vent Collapse | trace | 1¼ inches |

EXAMPLE 16

Molded Foam Using Foam Modifier of Example 6

Using the general procedure outlined above for preparing foams, molded flexible polyurethane foams were prepared from the formulations shown below utilizing the Foam Modifier 2 of Example 6 at two different water levels. Two comparative foams were made without a foam modifier. An Isocyanate Index of 100 (using TDI) was utilized in each of the formulations.

| | FORMULATIONS | | | |
|---|---|---|---|---|
| Materials | Foam 1 (php) | Foam 2 (php) | Foam 3 (php) | Foam 4 (php) |
| PC | 80 | 80 | 74 | 74 |
| PPA | 13 | 13 | 13 | 13 |
| PPC | 7 | 7 | 7 | 7 |
| Water | 5 | 6 | 5 | 6 |
| DEOA | 1.25 | 1.25 | 1.25 | 1.25 |
| K-2 | 0.3 | 0.3 | 0.3 | 0.3 |
| K-3 | 0.25 | 0.25 | 0.25 | 0.25 |
| K-5 | 0.25 | 0.25 | 0.25 | 0.25 |
| S-2 | 1.5 | 1.5 | 1.5 | 1.5 |
| Foam Modifier | — | — | 6.0 | 6.0 |

The molding characteristics of these formulations were as follows:

| | Foam 1 | Foam 2 | Foam 3 | Foam 4 |
|---|---|---|---|---|
| Mold Temp., °F. | 140 | 140 | 140 | 140 |
| Demold Time. min. | 5 | 5 | 5 | 5 |
| Cream Time, sec. | 5 | — | 5 | 5 |
| Exit Time. sec. | 46 | Collapse foam in mold | 39 | 40 |
| Extrusion wt., g. | 10.55 | | 5 | 6 |
| Pad wt., g. | 433 | — | 436 | 286 |
| Vent Collapse | 7.2 | Total collapse in mold | 0.1 | 1.4 |

Stability, as measured by Vent Collapse demonstrated that the molded foams prepared in accordance with this invention (Foams 3 and 4) were very stable, even at these high water contents.

The characteristics of the foams so produced were as follows:

| | Foam 1 | Foam 2 | Foam 3 | Foam 4 |
|---|---|---|---|---|
| Density, lb./cu. ft | 1.7 | — | 1.6 | 1.4 |
| Resiliency | 60 | — | 53 | 48 |
| IFD, lb./50 sq. in. | | | | |
| 25% | 19.3 | — | 17.5 | 18.5 |
| 50% | 34.8 | — | 31.8 | 33.3 |
| 65% | 53.0 | — | 48.0 | 50.5 |

EXAMPLE 17

Slab Foam Using a Foam Modifier and Comparison

Using the general procedure outlined above for preparing flexible foams, flexible slab foams were prepared, with and without a foam modifier, using the formulations shown below. The foam modifier utilized was the foam modifier of Example 1, except that 0.3 mol of succinic anhydride per mol of OH in polyol PC was used in making the foam modifier used in this Example. An Isocyanate Index of 115 (using TDI) was used in each of the formulations.

| | FORMULATIONS | |
|---|---|---|
| MATERIALS | Foam 1 (php) | Foam 2 (php) |
| PPF | 100 | 100 |
| Foam Modifier | — | 8.0 |
| K-1 | 0.1 | 0.1 |
| $CH_2Cl_2$ | 40 | 40 |
| S-7 | 1.0 | 1.0 |
| Stannous Octoate | 0.4 | 0.4 |
| $H_2O$ | 8.0 | 8.0 |

The foams had the following characteristics:

| | Foam 1 | Foam 2 |
|---|---|---|
| Foam Characteristics | Foam rose, split in the middle and collapsed | Foam rose to 9.8 in. and then settled 2.6 in. |
| Foam Density: | — | 0.8 lb./cu. ft. |
| Porosity | — | 51 CFM/ft.$^2$ |

The foam density and porosity of the product prepared from the formulation for Foam 1 were not measured because the collapse of the "foam" made such measurements superfluous. The observed foam rise and settle demonstrated that the foam prepared according to process of the present invention (Foam 2) was stable.

EXAMPLE 18

Slab Foams Prepared from Inorganic Acid/foam Modifiers

The following two water solutions of foam modifiers were prepared with deionized water and trisodium phosphate dodecahydrate or sodium tetraborate decahydrate:

| Foam Modifier Solution 1 | Foam Modifier Solution 2 |
|---|---|
| 9.22 g $Na_3PO_4.12H_2O$ | 9.28 g $Na_2B_4O_7.10H_2O$ |
| 90.78 g $H_2O$ | 90.75 g $H_2O$ |

Using the general procedure outlined above for preparing flexible polyurethane foams, slab flexible polyurethane foams were prepared from the formulations shown below utilizing the two Foam Modifier Solutions 1 and 2. An Isocyanate Index of 105 (using TDI) was utilized in each of the formulations below. The total water content of the formulations below is the combination of the water added as such, the water of hydration of the inorganic salts and the water of the Foam Modifier Solution added to the formulation. Therefore, there was approximately 6 php of water in each formulation.

| | Foam Formulations: | | | |
|---|---|---|---|---|
| Materials | Foam 1 (php) | Foam 2 (php) | Foam 3 (php) | Foam 4 (php) |
| PC | 80 | 80 | 80 | 80 |

-continued

| | Foam Formulations: | | | |
|---|---|---|---|---|
| Materials | Foam 1 (php) | Foam 2 (php) | Foam 3 (php) | Foam 4 (php) |
| PPA | 13 | 13 | 13 | 13 |
| PPC | 7 | 7 | 7 | 7 |
| Water | 6.1 | 6.1 | 6.1 | 6.1 |
| DEOA | 1.25 | 1.25 | 1.25 | 1.25 |
| K-2 | 0.30 | 0.30 | 0.30 | 0.30 |
| K-3 | 0.25 | 0.25 | 0.25 | 0.25 |
| K-5 | 0.25 | 0.25 | 0.25 | 0.25 |
| S-2 | 1.5 | 1.5 | 1.5 | 1.5 |
| $Na_3PO_4$ | 0.079 | 0.159 | — | — |
| $Na_2B_4O_7$ | — | — | 0.098 | 0.196 |

The following observations were made:

| | Foam 1 | Foam 2 | Foam 3 | Foam 4 |
|---|---|---|---|---|
| Rise Time, seconds | 41 | 40 | 41 | 35 |
| Tack-free Time (sec.)* | 160 | 150 | 140 | 110 |
| Misc. | side shrinkage | side shrinkage | shrinkage top and sides | shrinkage top and sides |

*Time from (a) the time step 3 of the general procedure is performed to (b) the time the foam ceases to feel tacky to the touch.

Despite the side and top shrinkage, stable high water foams were prepared in all four cases. Attempts to foam similar formulations without the foam modifiers would result in foam collapse.

EXAMPLE 19

Slab Foams Using Foam Modifier Solution 2 from Example 18

Using the general procedure outlined above for the preparation of flexible polyurethane foams, high water slab foams were prepared from the formulations shown below. An Isocyanate Index of 105 (using TDI) was utilized shown below in the formulations. The water concentrations in the formulations (shown below) represent the total water content (i.e., the sum of the amount of water added as such and the amount of water added with the foam modifier solution).

| | Formulation | | | |
|---|---|---|---|---|
| MATERIALS | Foam 1 (php) | Foam 2 (php) | Foam 3 (php) | Foam 4 (php) |
| PC | 80 | 80 | 80 | 80 |
| PPA | 20 | 20 | 20 | 20 |
| Water | 6 | 8 | 10 | 12 |
| $Na_2B_4O_7$ | 0.061 | 0.081 | 0.102 | 0.122 |
| DEOA | 1.25 | 1.25 | 1.25 | 1.25 |
| K-2 | 0.3 | 0.3 | 0.3 | 0.3 |
| K-3 | 0.25 | 0.25 | 0.25 | 0.25 |
| S-2 | 1.5 | 1.5 | 1.5 | 1.5 |

The following observations were made:

| | Foam 1 | Foam 2 | Foam 3 | Foam 4 |
|---|---|---|---|---|
| Rise Time, sec. | 27 | 40 | 35 | 35 |
| Tack-free Time, sec. | 100 | 87 | 65 | 55 |
| Density lb./cu. ft. | 0.95 | 0.8 | 0.69 | 0.68 |

This Example demonstrates that stable foams are produced in accordance with the process of this invention even at very high water content levels. Attempts to foam similar formulations without the foam modifiers would result in foam collapse.

EXAMPLE 20

Foams from High Primary Hydroxyl, Low Ethylene Oxide Content Polyols using a Foam Modifier A desirable system for polyurethane foam has been considered to be a polymer/polyol based on a polyol of high primary hydroxyl content (at least 70 mol. %) at a low (3 to 10 wt.%) ethylene oxide content. The processing into foam of such a polyol would reflect the desired high reactivity of the primary hydroxyl groups yet foams produced would have lower moisture sensitivity due to the lower ethylene oixde content. It has been found, however, that high primary hydroxyl, low ethylene oxide content foams are difficult to stabilize during foaming by conventional means. Foam stability can be judged in molded foam by "Vent Collapse".

In this example, three formulations are compared: with no foam modifier present; with 2 php. foam modifier present; and with 6 php. foam modifier present. The foam modifier used was essentially the same as the foam modifier of Example 1, except that 0.3 mol succinic anhydride per mol of OH in polyol PC was used to make the foam modifier used in this Example. This following formulations were used (each had an Isocyanate Index of 100 using TDI):

| | Foam 1 (php) | Foam 2 (php) | Foam 3 (php) |
|---|---|---|---|
| PPI | 50 php. | 50 php. | 50 php. |
| PC | 50 | 50 | 50 |
| Foam Modifier | — | 2.0 | 6.0 |
| Water | 4.5 | 4.5 | 4.5 |
| DEOA | 1.25 | 1.25 | 1.25 |
| K-2 | 0.3 | 0.3 | 0.3 |
| K-3 | 0.23 | 0.23 | 0.23 |
| K-5 | 0.25 | 0.25 | 0.25 |
| Dibutyltin dilauryl sulfide | 1.01 | 0.01 | 0.01 |
| S-4 | 1.5 | 1.5 | 1.5 |

The following conditions were used and results observed:

| | Foam 1 (php) | Foam 2 (php) | Foam 3 (php) |
|---|---|---|---|
| Mold Temperature: | 140° F. | 140° F. | 140° F. |
| Demold Time: | 8 min. | 8 min. | 8 min. |
| Cream Time: | 5 sec. | 5 sec. | 5 sec. |
| Exit Time: | 44 sec. | 41 sec. | 38 sec. |
| Extrusion Weight: | 13.39 g. | 10.85 g. | 5.94 g. |
| Pad Weight: | 485 g. | 485 g. | 477 g. |
| Appearance: | complete internal collapse | partial internal collapse | good |

These results demonstrate that, in the presence of the foam modifier, more stable molded foams are prepared, particularly at higher concentrations of the foam modifier.

EXAMPLE 21

Molded Foam Using $Na_2B_4O_7.10H_2O$ Foam Modifier

This example illustrates the preparation of a molded foam using sodium tetraborate as a foam modifier. Molded foams were prepared using the general procedure outlined above for preparing foams. The sodium tetraborate decahydrate was dissolved in water which was kept sufficiently warm to keep the tetraborate in solution. The tetraborate was added to the stirred formulation along with more water so that the total water and borate concentration were those described below.

|  | Foam 1 (php) | Foam 2 (php) |
|---|---|---|
| PC | 80 php. | 80 php. |
| PPA | 20 | 20 |
| Water | 6.0 | 8.0 |
| DEOA | 1.5 | 1.5 |
| K-2 | 0.3 | 0.05 |
| K-6 | 0.4 | 0.1 |
| $Na_2B_4O_7$ | 0.12 | 0.081 |
| S-2 | 4.0 | 2.5 |

The following conditions were used and results observed:

|  | Foam 1 (php) | Foam 2 (php) |
|---|---|---|
| Mold Temperature: | 155° F. | 150° F. |
| Demold Time: | 8 min. | 8 min. |
| Cream Time: | 5 sec. | 5 sec. |
| Exit Time: | 25 sec. | 25 sec. |
| Pad Weight: | 402 g. | 301 g. |
| Tightness: | open | open |
| Appearance | trace of heat set* | some heat set* |

*"Heat set" is densification in middle of molded foam.

Attempts to prepare a foam from this formulation without the foam modifier would result in collapse.

EXAMPLE 22

Foams were prepared from the formulations shown below using the above-described general procedure at an Isocyanate Index of 100 (using TDI) and PPH which is difficult to satisfactorily convert to polyurethane foam due to the presence of secondary hydroxyls. The foam modifier used in this Example was essentially the same as the foam modifier of Example 1, except that 0.3 mol succinic anhydride per mol OH in polyol PC was used to make the foam modifier used in this Example. The following formulations were used:

|  | Foam 1 (php) | Foam 2 (php) | Foam 3 (php) | Foam 4 (php) | Foam 5 (php) |
|---|---|---|---|---|---|
| PC | 60 | 60 | 58.25 | 58.25 | 58.25 |
| PPA | 40 | — | 40 | — | — |
| PPH | — | 40 | — | 40 | 40 |
| Foam Modifier | — | — | 1.75 | 1.75 | 1.75 |
| Water | 4.5 | 4.5 | 4.5 | 4.5 | 4.5 |
| DEOA | 1.25 | 1.25 | 1.25 | 1.25 | 1.25 |
| K-2 | 0.3 | 0.3 | 0.3 | 0.3 | 0.3 |
| K-3 | 0.23 | 0.23 | 0.23 | 0.23 | 0.23 |
| K-5 | 0.25 | 0.25 | 0.25 | 0.25 | 0.25 |
| Dibutylin dilaurylsulfide | 0.01 | 0.01 | 0.01 | 0.01 | 0.01 |
| S-4 | 1.5 | 1.5 | 1.5 | 1.5 | 1.5 |

The molding parameters were as follows:

| Mold Temp. | 140° F. | 140° F. | 140° F. | 140° F. | 140° F. |
|---|---|---|---|---|---|
| Demold Time: | 3 min. | 3 min. | 3 min. | 3 min. | 3 min. |
| Exit Time: | 42 sec. | 42 sec | 40 sec. | 40 sec. | 40 sec. |
| Vent Collapse: | 5.6 in. | Blow through Vent Collapse | 0 in. | 2.6 in. | 2.5 in. |

This Example demonstrates the foam stability achieved with the process of this invention (Foams 3, 4 and 5).

EXAMPLE 23

Molded Foams Using a Foam Modifier and an Alkanoic Acid

Using the general procedure outlined above for preparing flexible polyurethane foams, molded flexible polyurethane foams were prepared using the foam modifier similar to that of Example 1, except that 0.3 mol of succinic anhydride per mol of OH of polyol PC was used in preparing the modifier used in this Example. Formulations with 2-ethylhexanoic acid were compared to formulations without 2-ethylhexanoic acid. An Isocyanate Index of 100 (using TDI) was utilized in each of the formulations shown below.

| | FORMULATIONS: | | | |
|---|---|---|---|---|
| Material | Foam 1 (php) | Foam 2 (php) | Foam 3 (php) | Foam 4 (php) |
| PC | 80 | 80 | 80 | 80 |
| PPA | 13 | 13 | 13 | 13 |
| PPC | 7 | 7 | 7 | 7 |
| Foam Modifier | 4 | 4 | 6 | 6 |
| Water | 4.7 | 4.7 | 5.2 | 5.8 |
| DEOA | 1.25 | 1.25 | 1.25 | 1.25 |
| K-2 | 0.3 | 0.3 | 0.3 | 0.3 |
| K-3 | 0.23 | 0.23 | 0.23 | 0.23 |
| K-5 | 0.25 | 0.25 | 0.25 | 0.25 |
| S-2 | 1.35 | 1.35 | 1.35 | 1.35 |
| 2-ethyl-hexanoic acid | — | 0.1 | 0.2 | — |

The following conditions were used and results observed:

| Molding Parameters | Foam 1 (php) | Foam 2 (php) | Foam 3 (php) | Foam 4 (php) |
|---|---|---|---|---|
| Mold Temperature | 144° F. | 144° F. | 144° F. | 144° F. |
| Demold Time | 3 min | 3 min | 3 min | 3 min |
| Exit Time | 49 sec | 55 sec | 47 sec | sec |
| Density (lb./cu. ft) | 1.5 | 1.5 | 1.5 | 1.5 |
| Pad Appearance | good | good | good | good |
| Pad Weight, (gms) | 434 | 434 | 432 | 432 |
| Foam Tightness* | 3 | 2 | 2 | 4 |

*Foam Tightness - number of hand-crushes required to give a foam which will not shrink, i.e., to give an "open" foam.

As the Foam Tightness values indicate, the foams prepared from formulations containing 2-ethylhexanoic acid were more open.

EXAMPLE 24

Slab Foams for Using $Na_3PO_4.12H_2O$ Foam Modifier

Using the general procedure outlined above for preparing foams, slab foams were prepared from the formulations shown below using a 15% aqueous solution of trisodium phosphate dodeca hydrate as a foam modifier with and without a flame retardant ("Thermolin 101"). An Isocyanate Index of 103 (using TDI) was utilized in each of the formulations.

| Materials | FORMULATIONS | |
|---|---|---|
| | Foam 1 (php) | Foam 2 (php) |
| PPJ | 100 | 100 |
| Na₃PO₄ | 0.26 | 0.26 |
| Water (total) | 3.75 | 3.75 |
| DEOA | 1.0 | 1.0 |
| S-6 | 1.1 | 1.1 |
| K-8 | — | 0.25 |
| Stannous Octoate | | 0.125 |
| "Thermolin 101" | — | 1.0 |

The following results were observed:

| Foaming Parameters | Foam 1 | Foam 2 |
|---|---|---|
| Cream Time | 13 sec | 9 sec |
| Rinse Time | 98 sec | 90 sec |
| Density, lb./cu. ft. | 1.76 | 1.48 |
| Porosity, CFM/sq. ft. | 34.68 | 56.0 |

The results of the CAL 117 Test were:

| Foam 1 | | Foam 2 | |
|---|---|---|---|
| After flame time, sec. | Char Length, in. | After flame, time, sec. | Char Length, in. |
| 0.0 | 3.11 | 0.0 | 3.1 |
| 0.0 | 3.5 | 0.0 | 3.8 |
| 0.0 | 4.7 | 0.0 | 3.2 |
| 0.0 | 4.0 | 0.0 | 1.6 |
| 0.0 | 4.5 | 0.0 | 4.3 |
| pass | | pass | |

The CAL 117 Test data demonstrates that the use of trisodium phosphate in water produced foam that passed CAL 117 Test as well as the foam containing 1.0 php of "Thermolin 101".

EXAMPLE 25

Molded Foams Using Various Modifiers

Using the general procedure outlined above for preparing flexible polyurethane foams, molded foams were prepared from the formulations shown below using, as foam modifiers, the foam modifier of Example 6, trisodium phosphate and sodium tetraborate. A comparative foam was made without a foam modifier. An Isocyanate Index of 105 (using MT40) was utilized in each of the formulation. The following foam modifier solutions were prepared for use in the formulations:

| Solution 1 | Solution 2 |
|---|---|
| 35 g. of trisodium phosphate in 300 g. of water | 24.3 of sodium tetraborate in 300 g. of water |

Four foams were made from the following formulations:

| Materials | FORMULATIONS | | | |
|---|---|---|---|---|
| | Foam 1 (php) | Foam 2 (php) | Foam 3 (php) | Foam 4 (php) |
| PC | 62 | 52 | 62 | 62 |
| PPE | 38 | 38 | 38 | 38 |
| Water | 3.0 | 3.0 | 3.0 | 3.0 |
| Foam Modifier of Example 6 | — | 10 | — | — |
| Na₃PO₄ | — | — | 0.35 | — |
| Na₂B₄O₇ | — | — | — | 0.24 |
| DEOA | 0.3 | 0.3 | 0.3 | 0.3 |
| K-1 | 0.2 | 0.2 | 0.2 | 0.2 |
| K-2 | 0.15 | 0.15 | 0.15 | 0.15 |
| S-2 | 0.9 | 0.9 | 0.9 | 0.9 |
| Dibutyltindilaurate | 0.006 | 0.006 | 0.006 | 0.006 |

The following conditions were used and results observed:

| | Foam 1 | Foam 2 | Foam 3 | Foam 4 |
|---|---|---|---|---|
| Molding Parameters | | | | |
| Mold Temperature | 120° F. | 120° F. | 120° F. | 120° F. |
| Cream Time, sec | 4 | 4 | 4 | 4 |
| Exit Time, sec | 29 | 31 | 39 | 37 |
| Foam Characteristics | | | | |
| Density, lb/cu ft | 2.93 | 2.88 | 3.19 | 3.07 |
| Resiliency, % | 68.0 | 68.0 | 68.0 | 63.0 |
| Porosity CFM/sq ft | 54.63 | 42.8 | 32.0 | 45.47 |
| IFD | | | | |
| 25% | 47.75 | 50.5 | 59.8 | 52.0 |
| 65% | 134.0 | 133.5 | 160.3 | 148.5 |
| CFD | 0.70 | 0.78 | 0.95 | 0.86 |
| Tensile | 20.72 | 20.18 | 21.14 | 20.73 |
| Elongation | 98.52 | 95.53 | 89.78 | 84.45 |
| Tear | 1.48 | 1.37 | 1.38 | 1.44 |
| Comp. Set | | | | |
| 50% | 8.54 | 9.34 | 10.34 | 9.51 |
| 75% | 9.31 | 9.78 | 9.29 | 8.72 |
| HA Cond. 50% | 10.0 | 10.25 | 13.68 | 37.2 |
| HA Comp. Set 50% | 18.2 | 21.13 | 22.16 | 20.66 |
| Dry Heat | 6.54 | 2.89 | 15.67 | 2.54 |
| Cal 117 Test (10 samples) | 5 out of 10 samples failed Part A 5 had after flame | 10 out of 10 samples passed Part A None had after-flame | 10 out of 10 samples passed Part A None had after-flame | 10 out of 10 samples passed Part A None had after-flame |

The superior combustion resistance of Foams 2, 3 and 4 prepared with foam modifiers in accordance with the process of this invention is demonstrated in the CAL 117 Test.

EXAMPLE 26

Slab and Molded Foams Using Foam Modifiers

Using the general procedure outlined above for preparing foams, slab and molded foams were prepared from the formulations shown below using the foam modifier of Example 7. An Isocyanate Index of 100 (using TDI) was utilized in each formulation.

A. The slab formulation was as follows:

| Materials | Amount (php) |
|---|---|
| PC | 77 |
| PPA | 13 |
| PPC | 7 |
| Foam Modifier | 3 |
| Water | 6 |
| DEOA | 1.25 |
| K-2 | 0.3 |
| K-3 | 0.25 |

| Materials | Amount (php) |
|---|---|
| K-5 | 0.25 |
| S-2 | 1.5 |

After intensive mixing, the formulation was poured into a open-topped paper box. After 24 second the foam began to rise rapidly. Rise Time was 47 seconds. A smooth-topped foam resulted which did not shrink. In the absence of the foam modifier, this formulation would result in foam collapse.

B. The formulations below utilized three different foam modifiers:

Foam Modifier 1—Foam modifier of Example 7
Foam Modifier 2—Foam modifier made in the same manner as the modifier of Example 1, except that 0.3 mol succinic anhydride per mol of OH of polyol PC was used in preparing the modifier used in this Example.
Foam Modifier 3—Foam modifier made in the same manner as the modifier of Example 1, except that 0.25 mol succinic anhydride per mol of OH of polyol PC was used in producing the modifier used in this Example.

| Material | MOLDED FOAM FORMULATION | | |
|---|---|---|---|
| | Foam 1 (php) | Foam 2 (php) | Foam 3 (php) |
| PC | 57.9 | 57.9 | 57.53 |
| PPA | 26.7 | 26.7 | 26.7 |
| PPC | 13.3 | 13.3 | 13.3 |
| Foam Modifier 1 | — | 2.1 | — |
| Foam Modifier 2 | 2.1 | — | — |
| Foam Modifier 3 | — | — | 2.47 |
| DEOA | 1.25 | 1.25 | 1.25 |
| Water | 4.5 | 4.5 | 4.5 |
| K-2 | 0.3 | 0.3 | 0.3 |
| K-5 | 0.25 | 0.25 | 0.25 |
| S-8 | 1.52 | 1.52 | 1.52 |

Upon foaming the above formulations, the following conditions were used and results observed:

| | Foam 1 | Foam 2 | Foam 3 |
|---|---|---|---|
| Cream Time (sec.) | 8 | 8 | 8 |
| Exit Time (sec.) | 43 | 42 | 42 |
| Pad Weight (g.) | 471 | 475 | 472 |
| Vent Collapse (in.) | 3.0 | 2.5 | 2.0 |
| Puncture Cure (lb.) | 11.4 | 11.5 | 10.63 |

In the absence of the foam modifier, these formulations would result in foam collapse.

EXAMPLE 27

Preparation of Foam Modifier Based on a Siloxane Alcohol

A. To a one-liter, round-bottom reaction vessel was charged 99.98 grams of a siloxane alcohol of the formula:

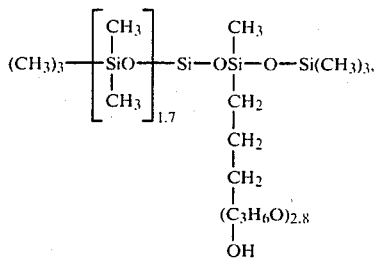

20.65 grams of succinic anhydride and a catalytic amount of KOH (200 ppm) were then added to the vessel. The reaction vessel was heated at 100° C. for one hour with stirring under nitrogen. The contents of the reaction vessel were then transferred to a 5-liter, glass round-bottom flask and 1360.1 grams of PC was added with stirring as a diluent. The acid number of the diluted contents was determined to be 7.7 mg KOH/g. The diluted contents were then neutralized with 11.64 grams of KOH in 60.6 grams of methanol, stripped of volatiles and the acid number of the final product determined to be 0.07 mg. KOH/g. The final product was the potassium salt of the succinic anhydride half-acid of the siloxane alcohol, B. Using the general procedure outlined above for preparing foams, molded foams were prepared using the final product of (A) above as the foam modifier. An Isocyanate Index of 100 (using TDI) was utilized in the formulation below:

| Foam Formulation | |
|---|---|
| Material | (php) |
| PC | 74 |
| PPA | 13 |
| PPC | 7 |
| Water | 6.0 |
| DEOA | 1.25 |
| K-2 | 0.3 |
| K-3 | 0.25 |
| K-5 | 0.25 |
| S-2 | 1.5 |
| Product of A | 6.0 |

| Molding Parameters | |
|---|---|
| Material | (php) |
| Mold Temperature, °F. | 140 |
| Demold Time, sec. | 5 |
| Cream Time, sec. | 5 |
| Exit Time, sec. | 38 |
| Extrusion Weight, g. | 6.17 |
| Pad Weight, g. | 383 |
| Tightness | tight |
| Vent Collapse, inches | 0 |

| Foam Properties | |
|---|---|
| Material | (php) |
| Density, lb/cu. ft. | 1.5 |
| Resiliency, % | 40 |
| Porosity, CFM/sq. ft. | 6.2 |
| IFD, lb./50 sq. in. | |
| 25% | 15.25 |
| 50% | 30.25 |
| 65% | 47.50 |
| Return value, % | 67.21 |
| Load Ratio, 65/25 | 3.1 |
| CFD, 50%, psi | 0.27 |
| Tensile Strength, psi | 16.7 |
| Elongation, % | 100.1 |
| Tear Resistance, lb./in. | 1.3 |
| Humid Age, Comp. Set, % | 57.1 |
| Dry Heat Aging, | 19.3 |

Molded foams prepared using these formulations without any foam modifier would have resulted in total internal foam collapse in the mold.

EXAMPLE 28

A. Using the general procedure outlined above for preparing polyurethane foams, slab foams were prepared using three different foam modifiers in the formulation described below. An Isocyanate Index of 100 (using TDI) was utilized in the formulations.

| Materials | Foam Formulations | | |
|---|---|---|---|
| | Foam 1 (php) | Foam 2 (php) | Foam 3 (php) |
| PC | 80 | 80 | 80 |
| PPA | 20 | 20 | 20 |
| Water | 6 | 6 | 6 |
| DEOA | 1.25 | 1.25 | 1.25 |
| K-2 | 0.3 | 0.3 | 0.3 |
| K-3 | 0.25 | 0.25 | 0.25 |
| S-2 | 1.5 | 1.5 | 1.5 |
| Foam Modifier | 3 php of Foam Modifier of Example 1 | 0.028 php KOH (dissolved in water) | 0.055 php potassium acetate (dissolved in water) |

| Foam Characteristics | | |
|---|---|---|
| Foam 1 Rise time of 65 sec. | Foam 2 Rise time of 68 sec. | Foam 3 Rise time of 52 sec. |
| Tough, cohesive foam with smooth skin and fine cells | Fine-celled rough, cohesive foam, slight side shrinkage | Fine-celled, tough foam, smooth skin |

B. Slab foams were prepared using the formulations described in (A) above, except that the salts described below (in water solutions) were each used as the foam modifier,

| Foam Modifier | (php) |
|---|---|
| sodium acetate | 0.041 |
| potassium hexoate | 0.077 |
| disodium hydrogen phosphate | 0.071 |
| potassium chloroacetate | 0.068 |
| sodium carbonate | 0.063 |
| lithium acetate | 0.071 |
| calcium acetate | 0.079 |

The foams prepared using these foam modifiers were fast curing foams with good tensile strength and fine cell structure.

EXAMPLE 29

A slab foam was prepared using the formulation and procedure described in Example 28, except that the combination of potassium iodide and trisodium phosphate was used as the foam modifier,

| Foam Modifier | (php) |
|---|---|
| Potassium Iodide | 0.26 |
| and trisodium phosphate | 0.12 |

Using this combination of an effective foam modifier (trisodium phosphate) and a compound not effective as a foam modifier (potassium iodide, see Comparative Example A below) in the same formulation produced a fine-celled foam with a rise time of 48 seconds. Although the foam was tight and there was considerable side shrinkage after 10 minutes, it was satisfactory.

EXAMPLE 30

Preparation of Foams Using Acids At Different Stages of Neutralization

Using the general procedure outlined above for preparing foams, slab foams were prepared using acetic acid, chloroacetic acid, dichloroacetic acid and trichloroacetic acid solutions in water as foam modifiers in the formulation shown below. An Isocyanate Index (using TDI) of 100 was utilized in the formulations.

| Foam Formulation | |
|---|---|
| Material | (php) |
| PC | 80 |
| PPA | 20 |
| Water | 2.1 |
| DEOA | 1.25 |
| K-2 | 0.3 |
| K-3 | 0.25 |
| S-2 | 1.5 |
| Foam Modifier (see below) | 4.0 |

The acetic acid, chloroacetic acid, dichloroacetic acid and trichloroacetic acid solutions in water to be used as the foam modifiers were "titrated" with aqueous potassium hydroxide solution to produce a series of "buffered" acid solutions at various stages of neutralization. About 100 g. of each 0.3 molal acid solution was sequentially titrated with about 20 g. increments of a KOH of essentially the same molality (see Table 1 below). After each addition of KOH, a 20 g. sample of the acid solution so "buffered" was taken for foam testing in a 6 php water foam formulation to prepare a slab foam. All samples were at essentially equal ionic strength: about 0.3 mol per 1000 g water. Ionic strength can be defined by the following formula:

Ionic Strength $= \frac{1}{2}\Sigma m_i z_i^2$ wherein $\Sigma$ means "the sum of"; $m_i$ in the molality of each species; and $z_i$ is the ionic charge of each species.

TABLE 1

| | ACID | | | |
|---|---|---|---|---|
| KOH (g. added to 100 g. of acid) | Acetic (pKa = 4.75) (Rise Time) | Chloroacetic (pKa = 4.75) (Rise Time) | Dichloroacetic (pKa = 2.85) (Rise Time) | Trichloroacetic (pKa = 0.70) (Rise Time) |
| 0 | (collapsed) | (collapsed) | (collapsed) | (collapsed) |
| 20 | 50 sec. | 90 sec. | (collapsed) | (collapsed) |
| 40 | 49 sec. | 81 sec. | (collapsed) | (collapsed) |
| 60 | 45 sec. | 72 sec. | 70 sec. | 81 sec. |
| 80 | 41 sec. | 65 sec. | 72 sec. | 66 sec. |
| 100 | 35 sec. | 56 sec. | 67 sec. | 52 sec. |

These results demonstrate that in general, at a given state of neutralization, the higher the pKa value of the acid, the more effective the foam modifier produced from these acids (the higher the pKa the faster the rise time of the foam).

EXAMPLE 31

Preparation of a Foam Modifier From Polyol PC

Polyol PC, 3515 pounds, was placed in a 500-gallon, glass-lined reactor which was evacuated then nitrogen purged to degas. Then 32.2 pounds of flake KOH (28.1 pounds of contained KOH by analysis) was added to the reactor and the contents heated to 120° C. with a nitrogen purge for about 6 hours. The alkalinity was measured and found to be 7.83 mg. KOH/gram. The reactor contents were cooled to about 80° C. and 40.0 pound succinic anhydride (80% of the calculated stoichiometry) were then added to the reactor and the contents were heated to about 125° C. and held for about 2 hours. A sample was taken to determine the alkalinity, acid number, free KOH and free succinate. The alkalinity was found to be 7.85 gm. KOH/gm and the free succinate was found to be 0.084% calculated as succinic acid. The free KOH was determined to be 1.09 mg. KOH/g. The acid number was found to be nil. Based on the above analysis, an additional 8.5 pounds of succinic anhydride were then added to the reactor to produce a product with low residual acidity and allowed to react for 0.5 hours with stirring at 125° C. under a nitrogen blanket. A sample of this product was analyzed and the following were found:

| | |
|---|---|
| Acid No. | 0.407 mg. KOH/gram |
| Alkalinity | 7.78 mg. KOH/gram |
| Free succinate | 0.12 wt. % as succinic acid |
| Viscosity | 3475 cks. (25° C.) |
| Water Content | 70 ppm |

The product was allowed to cool and the final product (foam modifier) was drummed. This foam modifier was the potassium salt of the succinic anhydride half-acid of polyol PC.

COMPARATIVE EXAMPLE A

A. Using the same procedure and formulation as described above in Example 28, except that the compounds listed below were used as "foam modifiers", attempts were made to prepare slab foams. None of the compounds listed below produced acceptable slab foams. Each "foam" suffered from one or more of the following defects:

| Defect | |
|---|---|
| A. | A low-rise mass which remained tacky for a long period of time. |
| B. | A large bubble developed under the surface and the foam collapsed when the bubble broke. |
| C. | A thick foam rose unevenly to about one-half the height of an acceptable foam and formed a very thick skin. |
| D. | A thick horny mass formed covering a foam having a coarse structure. |
| E. | The portion of the reacting mass which appeared to be foam was readily torn apart having little cohesive strength. |
| F. | No rise. |

| Compound | (php) | Defect |
|---|---|---|
| Sodium chloride | 0.028 | F |
| Sodium chloride | 0.057 | A |
| Sodium sulfate | 0.051 | B |
| Phosphoric acid | 0.097 | B |
| Acetic acid | 0.059 | A |
| Chloroacetic acid | 0.093 | A |
| Potassium Iodide | 0.16 | B |
| Sodium Dihydrogen Phosphate | 0.12 | B |
| Magnesium Sulfate | 0.12 | A and B |
| Zinc Sulfate | 0.16 | A and B |
| Calcium Carbonate | 0.098 | A |
| Calcium Phosphate | 0.15 | A |

Hence, these compounds were not effective as foam modifiers.

B. Using the same formulation and procedure as described above in Example 28, except that different foam modifiers were utilized in various liquid media, attempts were made to prepare slab foams. Certain "foams" suffered from one or more of the defects described in (A) above.

| Foam Modifier | Amount php* (Foam Modifier/ Liquid Medium) | Quality of Foam Produced |
|---|---|---|
| (1) KOH | 0.11 KOH/ 0.89 octaethylene glycol | Defect E |
| (2) KOH | 0.22 KOH/ 1.78 octaethylene glycol | Defect E |
| (3) KOH | 0.33 KOH/ 2.67 octaethylene glycol | (Too thick to pour) |
| (4) KOH | 0.11 KOH/ 0.39 triethylene glycol | Defect E |
| (5) "Jim Walters Foam Cat 70" | 0.21 potassium 2-ethylhexoate/ 0.09 diethylene glycol | Defect E |
| (6) "Jim Walters Foam Cat 70" | 0.42 potassium 2-ethylhexoate/ 0.18 diethylene glycol | Defect E |
| (7) "Jim Walters Foam Cat 70" | 0.63 potassium 2-ethylhexoate/ 0.27 diethylene glycol | Defects D and E |
| (8) "Jim Walters Foam Cat 70" | 0.21 potassium 2-ethylhexoate/ 0.09 diethylene glycol/ 6.0 water | Fine cell tough foam |
| (9) "Jim Walters Foam Cat 70" | 0.42 potassium 2-ethylehexoate/ 0.18 diethylene glycol/ 6.0 water | Fine cell tough foam |
| (10) "Jim Walters Foam Cat 70" | 0.63 potassium 2-ethylhexoate/ 0.27 diethylene glycol/ 6.0 water | Thick skin covering a tough foam |

*Based on polyol.

The liquid media utilized in (1)–(7) were not effective as a means for introducing the foam modifiers into the foam formulation. However, when water is used as a vehicle for introducing "Jim Walters Foam Cat 70" into the foam formulations, "Jim Walters Foam Cat 70" was a effective foam modifier [(8)–(10)].

COMPARATIVE EXAMPLE B

A. To a 5-liter, four-neck, round-bottom, glass reaction vessel fitted with stirrer, thermocouple and blanketed with nitrogen, there was charged 2100 grams of polyol PB with an hydroxyl number of 62.06. To this reaction vessel there was then added 77.98 grams of succinic anhydride and a catalytic amount flake KOH (0.44 g). The reaction vessel and contents were heated with stirring under nitrogen at 145° C. for 1.5 hours to produce the half-acid. The acid number of the half-acid so produced was determined to be 21.283 mg KOH/g of sample using a Mettler Memotitrator. To neutralize the half-acid, 400 g of the half-acid produced was charged to one liter, 4 neck, glass round-bottom reaction vessel fitted with stirrer and a blanket of nitrogen. Choline hydroxide (39.77 g) as a 45% solution in methanol was then added with stirring. (Choline hydroxide is a quaternary base: 2-hydroxyethyltrimethylammonium hydroxide). The reaction vessel and contents were heated at 125° C. The neutralized product so formed was stripped under vacuum. The final reaction product so produced was the choline salt of the succinic anhydride half-acid of polyol PB.

B. Using the general procedure outlined above for preparing foams, slab foams were prepared using the product of A above as a "foam modifier" in the formulation shown below. An Isocyanate Index of 100 (using TDI) was utilized in the formulation.

| FOAM FORMULATION | |
|---|---|
| Material | php |
| PC | 80 |
| PPA | 20 |
| Water | 6 |
| DEOA | 1.25 |
| K-2 | 0.3 |
| K-3 | 0.25 |
| S-2 | 1.5 |
| Product of A | 3 |

After intensive mixing the formulation was poured into an open-topped paper box. The foam produced had a low-volume and a very slow rise time. The foam produced lacked integrity, had a coarse bottom layer, a top layer of fine cells and was easily pulled apart. Example 28A above shows the production of a good foam from a similar formulation employing a foam modifier in accordance with the practice of this invention.

C. When the above foam formulation utilized choline 2-ethylhexoate in dipropylene glycol (sold as DABCO TMR-1) as the foam modifier, the foam suffered a total violent collapse.

What is claimed is:

1. A process for producing flexible polyurethane foams having improved foam stability comprising reacting and foaming in one step a reaction mixture comprising: (1) a polyol having a hydroxyl number from about 10 to about 100 and having greater than 50% primary hydroxy groups or greater than 50% secondary hydroxyl groups; (2) an organic polyisocyanate; (3) water; and (4) a foam modifier consisting of an alkali metal or alkaline earth metal ion and an anion of a Brönsted acid having a pKa of greater than 1, wherein said foam modifier is a foam modifier other than: (a) an inorganic alkaline earth metal salt that has a water solubility of less than one gram of salt per 100 milliliters of water at 25° C., (b) alkali metal dihydrogen phosphate or (c) alkali metal sulphate and wherein said composition has an Isocyanate Index from about 90 to about 130 with the proviso that, when there are greater than 50% secondary hydroxyl groups in the polyol, there are greater than 5.5 by weight parts water per 100 parts by weight of the polyol and with the further proviso that, when there are greater than 50% primary hydroxyl groups in the polyol, there are greater than 3.5 parts by weight water per 100 parts by weight of the polyol.

2. A process as claimed in claim 1 wherein the foam modifier is alkali or alkaline earth metal hydroxide.

3. A process as claimed in claim 1 wherein the foam modifier is alkali or alkaline earth metal salt of an inorganic acid, other than an inorganic alkaline earth metal salt that has a water solubility of less than one gram of salt per 100 milliliters of water at 25° C.

4. A process as claimed in claim 1 wherein the foam modifier is a salt of an alkali or alkaline earth metals and a carboxylic acid.

5. A process as claimed in claim 1 wherein the foam modifier is potassium hydroxide.

6. A process as claimed in claim 1 wherein the foam modifier is sodium hydroxide.

7. A process as claimed in claim 1 wherein the foam modifier is trisodium phosphate or tripotassium phosphate.

8. A process as claimed in claim 1 wherein the foam modifier is disodium or dipotassium hydrogen phosphate.

9. A process as claimed in claim 1 wherein the foam modifier is sodium or potassium tetraborate.

10. A process as claimed in claim 1 wherein the foam modifier is sodium or potassium carbonate.

11. A process as claimed in claim 1 wherein the foam modifier is sodium acetate or potassium acetate.

12. A process as claimed in claim 1 wherein the foam modifier is potassium or sodium hexoate.

13. A process as claimed in claim 1 wherein the foam modifier is potassium or sodium chloroacetate.

14. A process as claimed in claim 1 wherein the foam modifier is potassium or sodium dichloroacetate.

15. A process as claimed in claim 1 wherein the foam modifier is lithium acetate.

16. A process as claimed in claim 1 wherein the foam modifier is calcium acetate.

17. A process as claimed in claim 1 wherein the foam modifier is produced by: (1) reacting a cyclic anhydride with one of the hydroxyl groups of a polyol to form a monoester containing at least one hydroxyl group and one carboxylic group and (2) then reacting the carboxylic group with an alkali metal hydroxide to produce a salt of the carboxylic group.

18. A process as claimed in claim 1 wherein the foam modifier is produced by: (1) reacting one hydroxyl group of a polyol with an alkali metal hydroxide to produce an alkoxide and (2) then reacting the alkoxide with a cyclic anhydride to produce a salt of an ester having a carboxylic group derived from the anhydride.

19. A process as claimed in claim 1 wherein the polyol has a hydroxyl number from about 15 to about 85.

20. A process as claimed in claim 1 wherein the pKa of the foam modifier is greater than 2.5.

21. A process as claimed in claim 1 wherein the pKa of the foam modifier is greater than 3.5.

22. A process as claimed in claim 1 wherein the pKa is no greater than 13.

23. A process as claimed in claim 1 wherein the foam modifier has an Isocyanate Index from about 95 to about 120.

24. A process as claimed in claim 1 wherein the polyol has greater than 50% primary hydroxyl groups and there are greater than 3.5 parts by weight water per 100 parts by weight of a polyol.

25. A process as claimed in claim 1 wherein the polyol has greater than 50% secondary hydroxyl groups and there are greater than 5.5 parts by weight water per 100 parts by weight of a polyol.

26. A process as claimed in claim 1 wherein there are greater than 4.0 parts water per hundred parts polyol and there are greater than 65 percent primary hydroxy groups in the polyol.

27. A process as claimed in claim 1 wherein there are greater than 6.0 parts water per hundred parts polyol and there are greater than 70 percent secondary hydroxy groups in the polyol.

28. A process as claimed in claim 1 wherein there are no more than 12 parts water per 100 parts by weight of polyol in the reaction mixture.

29. A process as claimed in claim 1 wherein the polyol is a polymer/polyol.

30. A process as claimed in claim 1 wherein the polyol is a polymer/polyol in which the polymer is present in an amount from 1 to 65 weight percent based on the weight of the polymer/polyol.

31. A process as claimed in claim 1 wherein the polyol is a polyalkylene oxide triol.

32. A process as claimed in claim 1 wherein the polyol is a polyalkylene oxide tetrol.

33. A process as claimed in claim 1 wherein the polyol is a polyalkylene oxide hexol.

34. A process as claimed in claim 31, 32 or 33 wherein the alkylene oxide units are propylene oxide units.

35. A process as claimed in claim 31, 32 or 33 wherein the alkylene oxide is a mixture of propylene oxide and ethylene oxide where at least some of the ethylene oxide is a cap.

36. A process as claimed in claim 1 wherein the polyisocyanate is a mixture of tolylene diisocyanates.

37. A process as claimed in claim 1 wherein the polyisocyanate is a polymeric polymethylene poly(phenylene isocyanate).

38. A process as claimed in claim 1 wherein the polyisocyanate is 4,4'-diphenylmethylene diisocyanate.

39. A process as claimed in claim 1 wherein the polyisocyanate is a mixture of 4,4'-diphenylmethylene diisocyanate and a polymethylene poly(phenyleneisocyanate).

40. A process as claimed in claim 1 wherein the reaction mixture contains an alkanoic acid to increase the number of open cells in the foam.

41. A process as claimed in claim 1 wherein the reaction mixture contains a catalytic amount of an amine catalyst.

42. A process as claimed in claim 1 wherein the reaction mixture contains a catalytic amount of an amine catalyst selected from a group consisting of bis(N,N-dimethylaminoethyl)ether, trimethylamine, triethylamine, N-methylmorpholine, dimethylaminoethyl morpholine, N,N,N',N'-tetramethylhexanediamine, N-ethyl-morpholine, N,N-dimethylethanolamine, N,N,N'N'-tetramethyl-1,3-butanediamine, triethanolamine, 1,4-diazabicyclo[2.2.2]octane, pyridine oxide.

43. A process as claimed in claim 1 wherein the reaction mixture contains a catalytic amount of bis(N,N-dimethylaminoethyl)ether or 1,4-diazabicyclo [2.2.2]octane.

44. A process as claimed in claim 1 wherein the the reaction mixture contains a catalytic amount of a tin, lead or copper salt or a tin, lead or copper organo-metallic compound.

45. A process as claimed in claim 1 wherein the reaction material is essentially free of tin, lead or copper or a tin, lead or copper organo-metallic compound.

46. A process as claimed in claim 1 wherein the reaction material contains an auxiliary blowing agent.

47. A process as claimed in claim 1 wherein the auxiliary blowing agent is a member selected from the group consisting of trichloromonofluoromethane, dichlorodifluoromethane, dichloromonofluoromethane, methylene chloride, trichloromethane, 1,1-dichloro-1-fluoroethane, 1,1,2-trichloro-1,2,2-trifluoroethane, hexafluorocyclobutane and octafluorocyclobutane.

48. A process as claimed in claim 1 wherein a slabstock polyurethane foam is produced.

49. A process as claimed in claim 1 wherein a molded polyurethane foam is produced in a mold.

50. A process as claimed in claim 17 or 18 wherein the cyclic anhydride is succinic anhydride, the polyol is a polyalkylene oxide glycol, triol, tetrol or hexol and the hydroxide is potassium or sodium hydroxide.

51. A process as claimed in claim 1 in which the foam modifier is an alkali or alkaline metal salt of a polycarboxy-substituted polyether.

52. A process as claimed in claim 17 or 18 wherein the cyclic anhydride is the maleic anhydride, the polyol is a polyalkylene oxide glycol, triol, tetrol or hexol and the hydroxide is potassium or sodium hydroxide.

53. A process as claimed in claim 1 wherein the foam modifier is potassium or sodium oleate.

54. A process as claimed in claim 1 wherein the foam modifier is the potassium or sodium salt of a para-aminobenzoic acid.

55. A process as claimed in claim 1 wherein the foam modifier is a potassium or sodium salt of the half acid produced by amidation of succinic anhydride with diethanolamine.

56. A process as claimed in claim 1 wherein the foam modifier is a potassium or sodium salt of a half acid produced by esterification of succinic anhydride with dimethylaminoethoxyethanol.

57. A process as claimed in claim 1 wherein the polyol is a polyalkylene oxide polyol capped with from 3 to 10 wt.-% ethylene oxide and having a primary hydroxy content of greater than 70 mol. %.

58. A process as claimed in claim 1 wherein the foam modifier is a potassium or sodium salt of the half-acid of succinic anhydride and an alkoxypolyethyleneoxyethanol.

59. A process as claimed in claim 1 wherein the foam modifier is a triorganosiloxy endblocked polyoxyalkylene siloxane polymer of the general formula:

$$R_3Si-[OSi]_n-[OSi]_x-[OSi]_y-OSiR_3$$

with pendant groups including $R$, $R_2$, $R$, $R'$, $R'$, $O$, $R''$, $O$, $R''''$ and $\left[\begin{array}{c} C=O \\ | \\ R''' \end{array}\right]$, $\left[\begin{array}{c} C=O \\ | \\ O \\ | \\ A \end{array}\right]_w$ wherein:
R is selected from the group consisting of monovalent hydrocarbon and halogenated hydrocarbon radicals free of aliphatic unsaturation containing from 1 to 6 carbon atoms inclusive,
R' is a divalent hydrocarbon radical containing from 1 to 12 carbon atoms inclusive, R″ is a divalent hydrocarbon radical free of aliphatic unsaturation containing from 2 to 4 carbon atoms inclusive, R‴ is selected from the group consisting of a divalent and trivalent hydrocarbon radical containing from 2 to 6 carbon atoms inclusive, R″″ is hydrogen, R or acyl, A is selected from the group consisting of an alkali or alkaline earth metal, n has a value of from 0 to 25 inclusive, x has a value of from 0 to 100 inclusive, y has a value of from 1 to 100 inclusive, z,z' has a value of from 0 to 100 inclusive, and w has a value of from 1 to 2 inclusive.

60. A process as claimed in claim 59 wherein, in the general formula, R is a methyl radical, R' is a propylene radical, R″ is an ethylene and/or propylene radical, R‴ is an ethylene radical, R″″ is hydrogen, a methyl radical or an acyl radical, the value of n is within the range of 3 to 15, the value of x is within the range of from 0 to 25, the value of y is within the range of from 1 to 25, the value of z is within the range of from 1 to 20, and w is 1.

61. A process claimed in claim 1 wherein the foam modifier is present in an amount from about 0.01 to about 20 gram milliequivalents per 100 grams of the polyol.

62. A process for producing molded flexible polyurethane foams having improved combustion resistance and green strength comprising reacting and foaming in one step in a mold a reaction mixture comprising: (1) a polyol having a hydroxyl number from about 10 to about 100; (2) an organic polyisocyanate; (3) water; and (4) a foam modifier consisting of an alkali metal or alkaline earth metal ion and an anion of a Brönsted acid having a pKa of greater than 1, wherein said foam modifier is a foam modifier other than: (a) an inorganic alkaline earth metal salt that has a water solubility of less than one gram of salt per 100 milliliters of water at 25° C., (b) alkali metal dihydrogen phosphate and (c) alkali metal sulphate and wherein said composition has an Isocyanate Index from about 90 to about 130.

63. A process as claimed in claim 52 wherein the demold time of the molded foam is from 2.5 to 4 minutes and the Puncture Cure values of the molded foam are from 5 to 12.

64. A process as claimed in claim 52 wherein the demold time of the molded foam is from 1.4 to 4.5 minutes and the Puncture Cure values of the molded foam are from 5 to 12.

65. A process as claimed in claim 52 wherein the foam modifier is alkali or alkaline earth metal hydroxide.

66. A process as claimed in claim 52 wherein the foam modifier is alkali or alkaline earth metal salts of an inorganic acid.

67. A process as claimed in claim 52 wherein the foam modifier is a salt of an alkali or alkaline earth metals and a carboxylic acid.

68. A process as claimed in claim 52 wherein the foam modifier is potassium hydroxide.

69. A process as claimed in claim 52 wherein the foam modifier is sodium hydroxide.

70. A process as claimed in claim 52 wherein the foam modifier is trisodium or tripotassium phosphate.

71. A process as claimed in claim 52 wherein the foam modifier is sodium or potassium hydrogen phosphate.

72. A process as claimed in claim 52 wherein the foam modifier is sodium or potassium tetraborate.

73. A process as claimed in claim 52 wherein the foam modifier is sodium or potassium carbonate.

74. A process as claimed in claim 52 wherein the foam modifier is sodium or potassium acetate.

75. A process as claimed in claim 52 wherein the foam modifier is potassium or sodium hexoate.

76. A process as claimed in claim 52 wherein the foam modifier is potassium or sodium chloroacetate.

77. A process as claimed in claim 52 wherein the foam modifier is potassium or sodium dichloroacetate.

78. A process as claimed in claim 52 wherein the foam modifier is lithium acetate.

79. A process as claimed in claim 52 wherein the foam modifier is calcium acetate.

80. A process as claimed in claim 52 wherein the foam modifier is produced by: (1) reacting a cyclic anhydride with one of the hydroxyl groups of a polyol to form a monoester containing at least one hydroxyl group and one carboxylic group and (2) then reacting the carboxylic group with an alkali metal hydroxide to produce a salt of the carboxylic group.

81. A process as claimed in claim 52 wherein the foam modifier is produced by: (1) reacting one hydroxyl group of a polyol with an alkali metal hydroxide to produce an alkoxide and (2) then reacting the alkoxide with a cyclic anhydride to produce a salt of a carboxylic group derived from the anhydride.

82. A process as claimed in claim 52 wherein the polyol has a hydroxyl number from about 25 to about 85.

83. A process as claimed in claim 52 wherein the pKa of the foam modifier is greater than 2.5.

84. A process as claimed in claim 52 wherein the pKa of the foam modifier is greater than 3.5.

85. A process as claimed in claim 52 wherein the pKa is no greater than 13.

86. A process as claimed in claim 52 wherein the foam modifier has an Isocyanate Index from about 95 to about 120.

87. A process as claimed in claim 52 wherein there are greater than 4.0 parts water per hundred parts polyol and there are greater than 65 percent primary hydroxy groups in the polyol.

88. A process as claimed in claim 52 wherein there are greater than 6.0 parts water per hundred parts polyol and there are greater than 70 percent secondary hydroxy groups in the polyol.

89. A process as claimed in claim 52 wherein there are no more than 12 parts water per 100 parts by weight of polyol in the reaction mixture.

90. A process as claimed in claim 52 wherein the polyol is a polymer/polyol.

91. A process as claimed in claim 52 wherein the polyol is a polymer/polyol in which the polymer is present in an amount from 1 to 65 weight percent based on the weight of the polymer/polyol.

92. A process as claimed in claim 52 wherein the polyol is a polyalkylene oxide triol.

93. A process as claimed in claim 52 wherein the polyol is a polyalkylene oxide tetrol.

94. A process as claimed in claim 52 wherein the polyol is a polyalkylene oxide hexol.

95. A process as claimed in claim 92, 93 or 95 wherein the alkylene oxide units are propylene oxide units.

96. A process as claimed in claim 52, 93 or 94 wherein the alkylene oxide is a mixture of propylene oxide and ethylene oxide where at least some of the ethylene oxide is a cap.

97. A process as claimed in claim 52 wherein the polyisocyanate is a mixture of tolylene diisocyanates.

98. A process as claimed in claim 52 wherein the polyisocyanate is a polymeric polymethylene polyphenyl isocyanate.

99. A process as claimed in claim 52 wherein the polyisocyanate is 4,4'-diphenylmethylene diisocyanate.

100. A process as claimed in claim 52 wherein the poly isocyanate is a mixture of 4,4'-diphenylmethylene diisocyanate and a polymethylene poly(phenyleneisocyanate.

101. A process as claimed in claim 52 wherein the reaction mixture contains an alkanoic acid to increase the number of open cells in the foam.

102. A process as claimed in claim 52 wherein the reaction mixture contains a catalytic amount of an amine catalyst.

103. A process as claimed in claim 52 wherein the reaction mixture contains a catalytic amount of an amine catalyst selected from a group consisting of bis(N,N-dimethylaminoethyl)ether, trimethylamine, triethylamine, N-methylmorpholine, dimethylaminoethyl morpholine, N,N,N',N'-tetramethylhexanediamine, N-ethyl-morpholine, N,N-dimethylethanolamine, N,N,N'N'-tetramethyl-1,3-butanediamine, triethanolamine, 1,4-diazabicyclo[2.2.2]octane, pyridine oxide.

104. A process as claimed in claim 52 wherein the reaction mixture contains a catalytic amount of bis(N,N-di-methylaminoethyl)ether or 1,4-diazabicyclo[2.2.2]octane.

105. A process as claimed in claim 52 wherein the the reaction mixture contains a catalytic amount of a tin, lead or copper salt or a tin, lead or copper organo-metallic foam modifier.

106. A process as claimed in claim 52 wherein the reaction material is essentially free of tin, lead or copper or a tin, lead or copper organo-metallic compound.

107. A process as claimed in claim 52 wherein the reaction material contains an auxiliary blowing agent.

108. A process as claimed in claim 52 wherein the auxiliary blowing agent is member selected from the group consisting of trichloromonofluoromethane, dichlorodifluoromethane, dichloromonofluoromethane, methylene chloride, trichloromethane, 1,1-dichloro-1-fluoroethane, 1,1,2-trichloro-1,2,2-trifluoroethane, hexafluorocyclobutane and octafluorocyclobutane.

109. A process as claimed in claim 81 or 82 wherein the cyclic anhydride is succinic anhydride, the polyol is a polyalkylene oxide glycol or triol and the hydroxide is potassium or sodium hydroxide.

110. A process as claimed in claim 52 in which the foam modifier which is alkali or alkali metal salt of a polycarboxy-substituted polyether.

111. A process as claimed in claim 80 or 81 wherein the cyclic anhydride is the maleic anhydride, the polyol is a polyalkylene oxide glycol or triol and the hydroxide is potassium or sodium hydroxide.

112. A process as claimed in claim 52 wherein the foam modifier is potassium or sodium oleate.

113. A process as claimed in claim 52 wherein the foam modifier is a potassium or sodium salt of a para-aminobenzoic acid.

114. A process as claimed in claim 52 wherein the foam modifier is the potassium or sodium salt of the half-acid produced by amidation succinic anhydride with diethanolamine.

115. A process as claimed in claim 52 wherein the foam modifier is the potassium or sodium salt of the half acid produced by esterifying of succinic anhydride with dimethylaminoethoxyethanol.

116. A process as claimed in claim 52 wherein the foam modifier is a triorganosiloxy endblocked polyoxyalkylene siloxane polymer of the general formula:

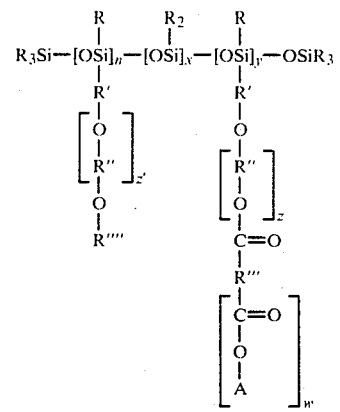

wherein:
R is selected from the group consisting of monovalent hydrocarbon and halogenated hydrocarbon radicals free of aliphatic unsaturation containing from 1 to 6 carbon atoms inclusive,
R' is a divalent hydrocarbon radical containing from 1 to 12 carbon atoms inclusive,
R'' is a divalent hydrocarbon radical free of aliphatic unsaturation containing from 2 to 4 carbon atoms inclusive,
R''' is selected from the group consisting of a divalent and trivalent hydrocarbon radical containing from 2 to 6 carbon atoms inclusive,
R'''' is hydrogen, R or acyl,
A is selected from the group consisting of an alkali or alkaline earth metal,
n has a value of from 0 to 25 inclusive,
x has a value of from 0 to 100 inclusive,
y has a value of from 1 to 100 inclusive,
z,z' has a value of from 0 to 100 inclusive, and
w has a value of from 1 to 2 inclusive.

117. A process as claimed in claim 116 wherein, in the general formula, R is a methyl radical, R' is a propylene radical, R'' is an ethylene and/or propylene radical, R''' is an ethylene radical, R'''' is hydrogen, a methyl radical or an acyl radical, the value of n is within the range from 3 to 15, the value of x is within the range of from 0 to 25, the value of y is within the range of from 1 to 25, the value of z is within the range of from 1 to 20, and w is 1.

118. A process as claimed in claim 52 wherein the foam modifier is present in an amount from about 0.01 to about 20 gram milliequivalents per 100 grams of the polyol.

119. A molded flexible polyurethane foam produced as claimed in claim 52.

120. A process for producing flexible polyurethane foams having improved foam stability comprising reacting and foaming in one step a reaction mixture comprising: (1) a polyoxyalkylene polyol having a hydroxyl number from about 10 to about 100 and having greater than 65% primary hydroxy groups; (2) an organic polyisocyanate; (3) water in an amount greater than 4 parts by weight of water per 100 parts by weights of the polyol; (4) a foam modifier that is an alkali metal or alkaline salt of a carboxylic acid, said acid being a Brönsted acid having a pKa from 2.5 to 13; and said foam modifier being present in an amount from about 0.01 to about 20 gram milliequivalents per 100 grams of the polyol; (5) a silicone surfactant; and (6) an amine catalyst for polyurethane formation, wherein said composition has an Isocyanate Index from about 90 to about 30.

121. A process for producing flexible polyurethane foams having improved foam stability comprising reacting and foaming in one step a reaction mixture comprising: (1) a polyoxyalkylene polyol having a hydroxyl number from about 10 to about 100 and having greater than 70% secondary hydroxyl groups; (2) an organic polyisocyanate; (3) water in an amount greater than 6 parts by weight of water per 100 parts by weight of the polyol; (4) a foam modifier that is an alkali metal or alkaline earth metal salt of a carboxylic acid, said acid being a Brönsted acid having a pKa of from 2.5 to 13, and said foam modifier being present in an amount from about 0.01 to about 20 gram milliequivalents per 100 grams of the polyol; (5) a silicone surfactant; and (6) an amine catalyst for polyurethane formation, wherein said composition has an Isocyanate Index from about 90 to about 300.

122. A process for producing molded flexible polyurethane foams having improved combustion resistance and green strength comprising reacting and foaming in one step in a mold a reaction mixture comprising: (1) a polyalkylene oxide polyol having a hydroxyl number from about 10 to about 100; (2) an organic polyisocyanate; (3) from 2.5 to 10 parts by weight of water per 100 parts by weight of the polyol; (4) a foam modifier that is an alkali metal or alkaline earth metal salt of a carboxylic acid, said acid being a Brönsted acid having a pKa from 2.5 to 13; and said foam modifier being present in an amount from about 0.01 to about 20 gram milliequivalents per 100 grams of the polyol; (5) a silicone surfactant; and (6) an amine catalyst for polyurethane formation, wherein said composition has an Isocyanate Index from about 90 to about 130 and wherein the demold time of the molded foam is from 1.5 to 4.5 minutes and the Puncture Cure value of the molded foam is from 5 to 12.

123. A process as claimed in claim 1 wherein the foam modifier is a sodium or potassium alkoxide.

124. A process as claimed in claim 52 wherein the foam modifier is a sodium or potassium alkoxide.

* * * * *